(12) United States Patent
French et al.

(10) Patent No.: US 6,263,447 B1
(45) Date of Patent: Jul. 17, 2001

(54) SYSTEM AND METHOD FOR AUTHENTICATION OF NETWORK USERS

(75) Inventors: Jennifer French, Dacula; Jone Wilder, Sugar Hill, both of GA (US)

(73) Assignee: Equifax Inc., Atlanta, GA (US)

( * ) Notice: Subject to any disclaimer, the term of this patent is extended or adjusted under 35 U.S.C. 154(b) by 0 days.

(21) Appl. No.: 09/315,128

(22) Filed: May 20, 1999

Related U.S. Application Data

(60) Provisional application No. 60/086,258, filed on May 21, 1998.

(51) Int. Cl.⁷ .................................................. H04L 9/32
(52) U.S. Cl. ........................ 713/201; 713/200; 380/30
(58) Field of Search .................................. 713/200, 201, 713/202; 381/30

(56) References Cited

U.S. PATENT DOCUMENTS

| | | |
|---|---|---|
| 4,661,658 | 4/1987 | Matyas ..................................... 380/23 |
| 5,214,702 | 5/1993 | Fischer . |
| 5,235,165 | 8/1993 | Sukegawa et al. . |
| 5,311,594 | 5/1994 | Penzias . |
| 5,327,497 | 7/1994 | Mooney et al. . |
| 5,420,926 | 5/1995 | Low et al. . |
| 5,436,972 | 7/1995 | Fischer .................................. 380/25 |
| 5,442,342 | 8/1995 | Kung . |
| 5,533,123 | 7/1996 | Force et al. . |
| 5,577,120 | 11/1996 | Penzias . |
| 5,638,446 | 6/1997 | Rubin . |
| 5,655,077 | 8/1997 | Jones et al. . |
| 5,659,616 | 8/1997 | Sudia . |
| 5,668,876 | 9/1997 | Falk et al. .............................. 380/25 |
| 5,677,955 | 10/1997 | Doggett et al. . |
| 5,684,950 | 11/1997 | Dare et al. . |
| 5,684,951 | 11/1997 | Goldman et al. . |
| 5,689,638 | 11/1997 | Sadovsky . |
| 5,706,427 | 1/1998 | Tabuki . |
| 5,712,914 | 1/1998 | Aucsmith et al. . |
| 5,748,738 | 5/1998 | Bisbee et al. .......................... 380/25 |
| 5,771,291 | * 6/1998 | Newton et al. ......................... 380/25 |
| 5,818,936 | 10/1998 | Mashayekhi . |
| 5,841,970 | 11/1998 | Tabuki . |
| 5,845,070 | 12/1998 | Ikudome . |
| 5,850,442 | 12/1998 | Muftic . |
| 5,864,665 | 1/1999 | Tran .................................. 395/187.01 |
| 5,872,917 | 2/1999 | Hellman . |
| 5,875,296 | 2/1999 | Shi et al. . |
| 5,893,098 | 4/1999 | Peters et al. ........................... 707/10 |
| 5,978,918 | * 11/1999 | Scholnick et al. .................... 713/201 |
| 5,987,134 | * 11/1999 | Shin et al. ............................. 380/25 |
| 5,987,232 | 11/1999 | Tabuki .............................. 395/187.01 |
| 6,006,333 | 12/1999 | Nielsen ................................. 713/202 |
| 6,026,491 | * 2/2000 | Hiles ..................................... 713/202 |

OTHER PUBLICATIONS

International Search Report for PCT/US99/11196.
Verisign webpage VeriSign, Inc., 1998, pp. 1–5.

* cited by examiner

*Primary Examiner*—Ly V. Hua
(74) *Attorney, Agent, or Firm*—Kilpatrick Stockton LLP

(57) ABSTRACT

A network authentication system provides verification of the identity or other attributes of a network user to conduct a transaction, access data or avail themselves of other resources. The user is presented with a hierarchy of queries based on wallet-type (basic identification) and non-wallet type (more private) information designed to ensure the identity of the user and prevent fraud, false negatives and other undesirable results. A preprocessing stage may be employed to ensure correct formatting of the input information and clean up routine mistakes (such as missing digits, typos, etc.) that might otherwise halt the transaction. Queries can be presented in interactive, batch processed, or other format. The authenticator can be configured to require differing levels of input or award differing levels of authentication according to security criteria.

50 Claims, 37 Drawing Sheets

FIG. 1

POSTAL SOFT STATUS CODE ACTION MATRIX (EXAMPLE)

| DIGIT 2 \ DIGIT 3 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | P | P | P | P | P | P | P | P | VP | VP | VP | VP | VP | VP | VP | VP |
| 1 | P | P | P | P | P | P | P | P | VP | VP | VP | VP | VP | VP | VP | VP |
| 2 | P | P | P | P | P | P | P | P | VP | VP | VP | VP | VP | VP | VP | VP |
| 3 | P | P | P | VP | VP | VP | P | P | VP | VP | VP | VP | VP | VP | VP | VP |
| 4 | P | P | P | VP | VP | VP | VP | VP | VP | VP | VP | VP | VP | VP | VP | VP |
| 5 | P | P | P | VP | VP | VP | VP | VP | VP | VP | VP | VP | VP | VP | VP | VP |
| 6 | P | P | P | P | P | P | P | P | VP | VP | VP | VP | VP | VP | VP | VP |
| 7 | P | P | P | P | P | P | P | P | VP | VP | VP | VP | VP | VP | VP | VP |
| 8 | P | P | P | VP | VP | VP | VP | VP | VP | VP | VP | VP | VP | VP | VP | VP |
| 9 | P | P | P | VP | VP | VP | VP | VP | VP | VP | VP | VP | VP | VP | VP | VP |
| A | P | P | P | VP | VP | VP | VP | VP | VP | VP | VP | VP | VP | VP | VP | VP |
| B | P | P | P | VP | VP | VP | VP | VP | VP | VP | VP | VP | VP | VP | VP | VP |
| C | P | P | VP | VP | VP | VP | VP | VP | VP | VP | VP | VP | VP | VP | VP | VP |
| D | P | P | VP | VP | VP | VP | VP | VP | VP | VP | VP | VP | VP | VP | VP | VP |
| E | P | P | P | VP | VP | VP | VP | VP | VP | VP | VP | VP | VP | VP | VP | VP |
| F | P | P | P | VP | VP | VP | VP | VP | VP | VP | VP | VP | VP | VP | VP | VP |

154

ACTION CODE DEFINITIONS

P   PROCEED TO AREA CODE VALIDATION.

VP  ON THE FIRST ATTEMPT PRESENT THIS MESSAGE: "PLEASE VERIFY THAT THE ADDRESS YOU HAVE ENTERED IS CORRECT AND RE-SUBMIT." ON THE SECOND AND LAST ATTEMPT, LOG THE TRANSACTION RESULTS AND PROCEED TO AREA CODE VALIDATION.

FIG. 9

| POSTAL SOFT ERROR CODE ACTION MATRIX (EXAMPLE) |||
|---|---|---|
| | ACTION ||
| ERROR CODE | ATTEMPT 1 | ATTEMPT 2 |
| E101 | V | M |
| E212 | V | M |
| E213 | V | M |
| E214 | V | M |
| E216 | V | P |
| E302 | V | P |
| E412 | V | P |
| E413 | V | P |
| E420 | V | P |
| E421 | V | P |
| E422 | V | P |
| E423 | V | P |
| E425 | V | P |
| E427 | V | P |
| E428 | V | P |
| E429 | V | P |
| E430 | V | P |
| E431 | V | P |
| E500 | V | P |
| E501 | M | - |
| E502 | V | M |
| E503 | V | P |
| E504 | V | P |
| E600 | V | M |

~156

ACTION CODE DEFINITIONS

V PRESENT THIS MESSAGE: "PLEASE VERIFY THAT THE ADDRESS YOU HAVE ENTERED IS CORRECT AND RE-SUBMIT."

M LOG TRANSACTION RESULTS AND PRESENT THIS MESSAGE: "WE ARE UNABLE TO IMMEDIATELY AUTHENTICATE YOUR IDENTITY WITH THE INFORMATION YOU HAVE PROVIDED. SOMEONE FROM OUR CUSTOMER SUPPORT DEPARTMENT WILL CONTACT YOU WITHIN THE NEXT 24 HOURS. IF YOU NEED TO SPEAK WITH SOMEONE IMMEDIATELY, PLEASE CALL CUSTOMER SUPPORT AT 1-800-999-9999."

P LOG TRANSACTION RESULTS AND PROCEED TO AREA CODE VALIDATION.

FIG. 10

| | APPLICATION VERIFICATION ACTION MATRIX (EXAMPLE) | |
|---|---|---|
| PROCESS AND OUTCOME | ACTION | MESSAGE |
| X SSN VALIDATION | | |
| PASS | GO TO ADDRESS VALIDATION | |
| FIRST REJECT | PRESENT MESSAGE | PLEASE VERIFY THAT THE SOCIAL SECURITY NUMBER YOU HAVE ENTERED IS CORRECT AND RE-SUBMIT. |
| SECOND REJECT | LOG ALL APPLICATION DATA AND RESULTS OF SSN VALIDATION. PRESENT MESSAGE AND FORWARD APPLICATION TO CUSTOMER SUPPORT FOR MANUAL EVALUATION. | WE ARE UNABLE TO IMMEDIATELY AUTHENTICATE YOUR IDENTITY WITH THE INFORMATION YOU HAVE PROVIDED. SOMEONE FROM OUR CUSTOMER SUPPORT DEPARTMENT WILL CONTACT YOU WITHIN THE NEXT 24 HOURS. IF YOU NEED TO SPEAK WITH SOMEONE IMMEDIATELY, PLEASE CALL CUSTOMER SUPPORT AT 1-800-999-9999. |
| X ADDRESS VALIDATION | SEE POSTAL SOFT ACTION MATRICES | SEE POSTAL SOFT ACTION MATRICES |
| X AREA CODE VALIDATION | | |
| PASS | GO TO DRIVERS LICENSE VALIDATION | |
| FIRST REJECT | PRESENT MESSAGE | PLEASE VERIFY THAT THE HOME PHONE NUMBER YOU HAVE ENTERED IS CORRECT AND RESUBMIT. |
| SECOND REJECT | LOG RESULTS AND PROCEED TO NEXT PROCESS. | |
| X DRIVERS LICENSE VALIDATION | | |
| PASS | GO TO IDENTIFICATION DECISIONING | |
| FIRST REJECT | PRESENT MESSAGE | PLEASE VERIFY THAT THE DRIVERS LICENSE NUMBER YOU HAVE ENTERED IS CORRECT AND RE-SUBMIT. |
| SECOND REJECT | LOG RESULTS AND PROCEED TO NEXT PROCESS. | |

FIG. 11

TRANSACTION DATA REQUIRED FOR TRANSACTION LOGS 112

TRANSACTION ID

| | |
|---|---|
| TRANS NO. | |
| CUSTOMER NO. | |
| CONSUMER ID | |
| DATE/TIME | |

APPLICATION INFORMATION*

| | |
|---|---|
| LAST NAME | |
| FIRST NAME | |
| MIDDLE NAME OR INITIAL | |
| SUFFIX | |
| MAIDEN NAME | |
| CURRENT ADDRESS - LINE 1 | |
| CURRENT ADDRESS - LINE 2 | |
| CURRENT ADDRESS - COUNTY | |
| CURRENT ADDRESS - CITY | |
| CURRENT ADDRESS - STATE | |
| CURRENT ADDRESS - ZIP CODE | |
| AT CA < 2 YEARS INDICATOR | |
| FORMER ADDRESS - LINE 1 | |
| FORMER ADDRESS - LINE 2 | |
| FORMER ADDRESS - COUNTY | |
| FORMER ADDRESS - CITY | |
| FORMER ADDRESS - STATE | |
| FORMER ADDRESS - ZIP CODE | |
| HOME PHONE NUMBER | |
| HOME PHONE > 4 MOS OLD INDICATOR | |
| AREA CODE CHANGE INDICATOR | |
| HOME PHONE PUB INDICATOR | |
| WORK PHONE NUMBER | |
| WORK PHONE EXTENSION | |
| GENDER | |
| DATE OF BIRTH | |
| SOCIAL SECURITY NUMBER | |
| DRIVERS LICENSE ISSUED INDICATOR | |
| DRIVERS LICENSE NUMBER | |
| DRIVERS LICENSE STATE OF ISSUE | |
| DL ADDRESS ≠ CA OR FA INDICATOR | |
| DL ADDRESS - LINE 1 | |
| DL ADDRESS - LINE 2 | |
| DL ADDRESS - CITY | |
| DL ADDRESS - STATE | |
| DL ADDRESS - ZIP CODE | |

APPLICATION INFORMATION (CONTINUED)

FIG. 13

| | |
|---|---|
| MOTHER'S MAIDEN NAME | |
| YEAR OF HIGH SCHOOL GRADUATION | |
| NUMBER OF SIBLINGS | |
| E-MAIL ADDRESS | |

112

*INFORMATION RECEIVED ON THE APPLICATION WILL BE STORED EXACTLY AS PROVIDED BY THE CONSUMER ON THE APPLICATION FORM.

| PROCESSING RESULTS | |
|---|---|
| PROCESS COMPONENT | |
| PROCESS STATUS CODE | |
| PROCESS SCORE | |
| DATE/TIME | |

| VALID PROCESS COMPONENTS | VALID PROCESS SCORES |
|---|---|
| SSN VALIDATION | PASS, FAIL |
| ADDRESS VALIDATION | P, F |
| AREA CODE VALIDATION | P, F |
| DRIVER'S LICENSE FORMAT VALIDATION | P, F |
| ACRO ID COMPARE | BIG, REGULAR, POSSIBLE, NO HIT |
| METROMAIL ID COMPARE | B, R, P, N |
| DRIVERS LICENSE ID COMPARE | B, R, P, N |
| CUSTOMER LIST ID COMPARE | B, R, P, N |
| TRADE LINE TEST | B, R, P, N |
| MANUAL EVALUATION | B, R, P, N |
| ID DECISION | B, R, P, N |

| VALID PROCESS STATUS CODES | |
|---|---|
| STATUS CODE | DESCRIPTION |
| NOT ASSIGNED | PROCESS COMPLETE |
| NOT ASSIGNED | PROCESS COMPLETE - FLAGGED FOR MANUAL |
| NOT ASSIGNED | ABORTED - COMM ERROR |
| NOT ASSIGNED | ABORTED - SYSTEM ERROR |
| NOT ASSIGNED | ABORTED - SENT TO MANUAL |
| | |
| | |
| | |
| | |

| SSN VALIDATION DATA | |
|---|---|
| SSN EDIT CHECKS | PASS, FAIL, NOT INVOKED |
| SSN ISSUED CHECK | P, F, N |
| SSN DECEASED | P, F, N |
| SSN FRAUD | P, F, N |
| TABLE VERSION NO(S) | |

FIG. 14

| POSTALSOFT OUTPUT | |
|---|---|
| OUTPUT ADDRESS | |
| STATUS OR ERROR CODE | |
| RECORD TYPE | |
| DIRECTORY VERSION | |
| PROGRAM VERSION | |

| ACRO ID COMPARE DATA | |
|---|---|
| FILES RETURNED | 0, 1, 2, 3, 4 |
| FRAUD VICTIM | Y, N |
| SAFESCAN CODE | |
| L90 SEARCH SCORE | |

| CHOICEPOINT DRIVERS LICENSE ID COMPARE DATA | |
|---|---|
| CP # OF CANDIDATES RETURNED | |
| CP P151 CLASSIFICATION | RS = REPORT SUBJECT |
| CP NAME - LAST | |
| CP NAME - FIRST | |
| CP NAME - MIDDLE | |
| CP NAME - SUFFIX | |
| CP DATE OF BIRTH | |
| CP GENDER | |
| CP SSN | |
| CP FSI - NAME - LAST | MATCH, DISCREPANCY, BLANK |
| CP FSI - NAME - FIRST | M, D, BLANK |
| CP FSI - NAME - MIDDLE | M, D, BLANK |
| CP FSI - NAME - SUFFIX | M, D, BLANK |
| CP FSI - DATE OF BIRTH | M, D, BLANK |
| CP FSI - GENDER | M, D, BLANK |
| CP FSI - SSN | M, D, BLANK |
| CP DL51 CLASSIFICATION | CP = CURRENT PERSONAL<br>CL = CURRENT LEARNER'S PERMIT<br>CC = CURRENT COMMERCIAL<br>PP = PREVIOUS PERSONAL<br>PC = PREVIOUS COMMERCIAL |
| CP DRIVER'S LICENSE NUMBER | |
| CP DRIVER'S LICENSE STATE | |
| CP FSI - DRIVER'S LICENSE NBR | M, D, BLANK |
| CP FSI - DRIVER'S LICENSE STATE | M, D, BLANK |
| CP DRIVER'S LICENSE EXPIRATION DATE | POSSIBLE FUTURE ENHANCEMENT |
| CP DRIVER'S LICENSE ISSUE DATE | POSSIBLE FUTURE ENHANCEMENT |
| CP AL51 CLASSIFICATION | RA = RESIDENCE ADDRESS<br>FA = FORMER ADDRESS |
| CP ADDRESS - HOUSE NUMBER | |
| CHOICEPOINT DRIVER'S LICENSE ID COMPARE DATA (CONT) | |

FIG. 15

| | |
|---|---|
| CP ADDRESS - STREET NAME | |
| CP ADDRESS - APARTMENT NUMBER | |
| CP ADDRESS - CITY | |
| CP ADDRESS - STATE | |
| CP ADDRESS - ZIP | |
| CP ADDRESS - ZIP CODE + 4 | |
| CP FSI - ADDRESS - HOUSE NUMBER | M, D, BLANK |
| CP FSI - ADDRESS - STREET NAME | M, D, BLANK |
| CP FSI - ADDRESS - APT NUMBER | M, D, BLANK |
| CP FSI - ADDRESS - CITY | M, D, BLANK |
| CP FSI - ADDRESS - STATE | M, D, BLANK |
| CP FSI - ADDRESS - ZIP CODE | M, D, BLANK |
| CP FSI - ADDRESS - ZIP CODE + 4 | M, D, BLANK |

* CP = CHOICEPOINT

| METRONET ID COMPARE DATA | |
|---|---|
| MN NAME | |
| MN ADDRESS | |
| MN PHONE NUMBER | |
| MN PRIMARY RESPONSE CODE | |
| MN NM/ADD VERIFICATION RESPONSE CODE | |
| MN PHONE VERIFICATION RESPONSE CODE | |
| MN EDA REQUEST | Y, N |
| MN EDA REQUEST CONFIDENCE CODE | NULL, IF EDA CHECK = 'N' |

* MN = METRONET

| TRADE LINE TEST DATA | |
|---|---|
| TRADE TYPE | M, A, P, S, G |
| DATE OPENED | |
| LENDER NAME | |
| LENDER - MULTIPLE CHOICE OPTIONS* | |
| LENDER - CONSUMER RESPONSE | |
| TERMS OR MONTHLY PMT | |
| TERMS OR MONTHLY PMT - MC OPTIONS* | |
| TERMS OR MONTHLY PMT - CONSUMER RESP | |

* MULTIPLE CHOICE OPTIONS SHOULD BE STORED IN THE ORDER PRESENTED TO THE CONSUMER AND WITH THE CORRECT RESPONSE INCLUDED.

FIG. 16

| MATCH NAME | PATTERN RECOGNITION CODE | FIELDS MATCHED | FIELDS NOT EQUAL | FIELDS IN WHICH MATCH IS IRRELEVANT | TIME FRAME | ADDITIONAL CRITERIA | REASONING |
|---|---|---|---|---|---|---|---|
| SAME CONSUMER | C | LAST NAME, FIRST NAME, SSN, DOB, VALID SSN FLAG | | STR NUM, CITY, STATE, ZIP, E-MAIL ADDRESS, IP ADDRESS, HOME PHONE NUMBER | GREATER THAN 2 ATTEMPTS WITHIN 72 HOURS | | ON 2ND ATTEMPT, RECOGNIZE THE CONSUMER HAS VISITED US ONCE BEFORE AND DISPLAY THE SAME QLT. POSSIBLE FRAUD: GREATER THAN 2 ATTEMPTS FOR SAME CONSUMER |
| SAME E-MAIL ADDRESS/ DIFFERENT CUSTOMER | D | E-MAIL ADDRESS MATCHES | | STR NUM, CITY, STATE, ZIP, IP ADDRESS, HOME PHONE NUMBER | GREATER THAN 2 ATTEMPTS WITHIN 72 HOURS | IF SAME FIRST NAME AND SAME LAST NAME AND SAME SSN AND SAME DOB -> OK; ELSE IF DIFFERENT FIRST NAME OR DIFFERENT LAST NAME OR DIFFERENT SSN OR DIFFERENT DOB -> POSSIBLE FRAUD RECOGNIZED | SAME PERSON MAY RE-ENTER APPLICATION; POSSIBLE FRAUD: ODDS OF MULTIPLE ATTEMPTS WITHIN SPECIFIED TIME FRAME THRU DIFFERENT CUSTOMERS FROM SAME E-MAIL ADDRESS ARE UNLIKELY - EXCEPT FOR SPOUSES (CHILDREN OVER 18 PROBABLY HAVE DIFFERENT E-MAIL ADDRESSES). |
| SAME E-MAIL ADDRESS/SAME CUSTOMER | E | E-MAIL ADDRESS MATCHES | | STR NUM, CITY, STATE, ZIP, IP ADDRESS, HOME PHONE NUMBER | GREATER THAN 2 ATTEMPTS WITHIN 60 HOURS | IF SAME FIRST NAME AND SAME LAST NAME AND SAME SSN AND SAME DOB -> OK; ELSE IF DIFFERENT FIRST NAME OR DIFFERENT LAST NAME OR DIFFERENT SSN OR DIFFERENT DOB -> POSSIBLE FRAUD RECOGNIZED | SAME PERSON MAY RE-ENTER APPLICATION; POSSIBLE FRAUD: ODDS OF MULTIPLE ATTEMPTS WITHIN SPECIFIED TIME FRAME THRU SAME CUSTOMER FROM SAME E-MAIL ADDRESS ARE UNLIKELY - EXCEPT FOR SPOUSES. CUSTOMERS SHOULD USE SPECIAL ACCESS ID AFTER RCA COMPLETED ONCE. |
| SAME LAST NAME | L | LAST NAME, IP ADDRESS MATCHES | | STR NUM, CITY, STATE, ZIP, IP ADDRESS, HOME PHONE NUMBER | GREATER THAN 2 ATTEMPTS WITHIN 72 HOURS | IF SAME FIRST NAME AND SAME SSN AND SAME DOB -> OK; ELSE IF DIFFERENT FIRST NAME OR DIFFERENT SSN OR DIFFERENT DOB -> POSSIBLE FRAUD RECOGNIZED | FRAUD (AND POSSIBLY HOSTILE ATTACK?) : SOMEONE KNOWS LAST NAME, AND POSSIBLY ADDRESS, CHANGES FIRST NAME, SSN, AND/OR DOB TO 'STEAL IDENTITY' |

FIG. 17  904

| | | | | | |
|---|---|---|---|---|---|
| SAME ADDR & SSN | S | STR NUM, CITY, STATE, ZIP, SSN, VALID SSN FLAG ALL MATCH | LAST NAME | GREATER THAN 2 ATTEMPTS WITHIN 72 HOURS | | FRAUD: SOMEONE STEALING INFO ABOUT ANOTHER, BUT USING OWN ADDRESS FOR MAILING PURPOSES, TRYING VARIOUS LAST NAMES |
| SAME ADDR & LAST NAME | N | STR NUM, CITY, STATE, ZIP, LAST NAME, VALID SSN FLAG ALL MATCH | SSN | GREATER THAN 2 ATTEMPTS WITHIN 72 HOURS | | FRAUD: SOMEONE STEALING INFO ABOUT ANOTHER, BUT USING OWN ADDRESS FOR MAILING PURPOSES, TRYING VARIOUS SSNs |
| 6 FOR 6 | X | LAST NAME, FIRST NAME, IP ADDRESS, SSN, DOB, E-MAIL, STATE, ZIP ALL MATCH | | FIRST NAME, DOB, HOME PHONE NUMBER | GREATER THAN 2 ATTEMPTS WITHIN 72 HOURS | ON 2ND ATTEMPT, RECOGNIZE THE CONSUMER HAS VISITED US ONCE BEFORE AND DISPLAY THE SAME QILT. POSSIBLE FRAUD: GREATER THAN 2 ATTEMPTS FOR SAME CONSUMER. |
| SAME APPLICATION | A | IP ADDRESS, FIRST NAME, MIDDLE, LAST NAME, SUFFIX, E-MAIL ADDRESS, STR NUMBER, STREET NAME, STREET TYPE, CITY, STATE, ZIP, SSN, HOME PHONE, DOB, SSN VALID FLAG ALL THE MATCH | LAST NAME | | GREATER THAN 2 ATTEMPTS WITHIN 24 HOURS | POSSIBLE HOSTILE ATTACK - SOMEONE VARYING PIECE OF APPLICATION INFORMATION - SIMILAR TO ATTEMPTS FOR ACRO FILES (PER JIM DIFFENBAUGH) |

FIG. 18

| MATCH NAME | NUMBER OF SESSIONS (RETURNED FROM PATTERN RECOGNITION) | ACTION |
| --- | --- | --- |
| SAME CONSUMER | 0 | NEW QILT |
| SAME CONSUMER | 1 | PREVIOUS QILT |
| SAME CONSUMER | >1 | SUSPECTED FRAUD: LOCK OUT |
| SAME E-MAIL/DIFFERENT CUSTOMER/DIFFERENT CONSUMER | 0 | NEW QILT |
| SAME E-MAIL/DIFFERENT CUSTOMER/DIFFERENT CONSUMER | 1 | NEW QILT |
| SAME E-MAIL/DIFFERENT CUSTOMER/DIFFERENT CONSUMER | >1 | SUSPECTED FRAUD: LOCK OUT |
| SAME E-MAIL/SAME CUSTOMER/DIFFERENT CONSUMER | 0 | NEW QILT |
| SAME E-MAIL/SAME CUSTOMER/DIFFERENT CONSUMER | 1 | NEW QILT |
| SAME E-MAIL/SAME CUSTOMER/DIFFERENT CONSUMER | >1 | SUSPECTED FRAUD: LOCK OUT |
| SAME LAST NAME/SAME IP ADDRESS | 0 | NEW QILT |
| SAME LAST NAME/SAME IP ADDRESS | 1 | NEW QILT |
| SAME LAST NAME/SAME IP ADDRESS | >1 | SUSPECTED FRAUD: LOCK OUT |
| SAME ADDRESS/SAME SSN/DIFFERENT LAST NAME | 0 | NEW QILT |
| SAME ADDRESS/SAME SSN/DIFFERENT LAST NAME | 1 | NEW QILT |
| SAME ADDRESS/SAME SSN/DIFFERENT LAST NAME | >1 | SUSPECTED FRAUD: LOCK OUT |
| SAME ADDRESS/DIFFERENT SSN/SAME LAST NAME | 0 | NEW QILT |
| SAME ADDRESS/DIFFERENT SSN/SAME LAST NAME | 1 | NEW QILT |
| SAME ADDRESS/DIFFERENT SSN/SAME LAST NAME | >1 | SUSPECTED FRAUD: LOCK OUT |
| 6 FOR 6 | 0 | NEW QILT |
| 6 FOR 6 | 1 | NEW QILT |
| 6 FOR 6 | >1 | SUSPECTED FRAUD: LOCK OUT |
| SAME APPLICATION | 0 | NEW QILT |
| SAME APPLICATION | 1 | NEW QILT |
| SAME APPLICATION | >1 | SUSPECTED FRAUD: LOCK OUT |

FIG. 19   912

TRADE LINE TEST POINT ASSIGNMENT MATRIX FOR TRADE TYPES
(EXAMPLE)

| MORTGAGE LOAN QUESTION(S) | AUTO LOAN QUESTION(S) | INSTALLMENT LOAN QUESTION(S) | STUDENT LOAN QUESTION(S) | GAS CARD QUESTION | MAX ALLOWABLE CERTAINTY SCORE |
|---|---|---|---|---|---|
| 50 | 25 | 25 | | | 100 |
| 50 | 30 | | 20 | | 100 |
| 50 | 40 | 30 | 20 | 10 | 100 |
| 50 | | 40 | | | 100 |
| 50 | 35 | 35 | 30 | 10 | 100 |
| 60 | 45 | 45 | 30 | 10 | 100 |
| | 50 | 50 | | | 100 |
| | 40 | | 30 | 10 | 90 |
| 50 | | 40 | 30 | 10 | 90 |
| 50 | 45 | 45 | | | 90 |
| 60 | 50 | 50 | 30 | | 90 |
| 60 | 50 | 50 | | 10 | 70 |
| | | | 30 | | 90 |
| | | | | 10 | 80 |
| | | | 30 | 10 | 60 |
| 50 | | | | | 80 |
| | 40 | 40 | | 10 | 60 |
| | | | | | 40 |
| | | | 30 | | 50 |
| | | | | | 40 |
| | | | | 10 | 40 |
| | | | | | 30 |
| | | | | | 10 |

FIG. 20

| TRADE LINE TEST WEIGHT ASSIGNMENT MATRIX FOR QUESTION TYPES (EXAMPLE) (%) | | | |
|---|---|---|---|
| LENDER NAME QUESTION | MONTHLY PAYMENT QUESTION | TERMS QUESTION | NO SECOND QUESTION |
| 75 | 25 | | |
| 80 | | 20 | |
| 80 | | | 0 |
| *100 | 0 | | |
| *100 | | 0 | |

* THESE ENTRIES APPLY TO THE GAS CARD TRADE TYPE ONLY. A SECOND QUESTION WILL NEVER BE POSED FOR GAS CARD TRADE TYPES, THEREFORE ALL OF THE POINTS AVAILABLE FOR THIS TRADE TYPE SHOULD BE APPLIED TO THE CREDIT PROVIDER QUESTION.

| MATCH QUALITY MATRIX FOR TRADE LINE TEST (EXAMPLE) | |
|---|---|
| CERTAINTY SCORE | CUSTOMER RANKING |
| 85 - 100 | B |
| 40 - 84 | R |
| 10 - 39 | P |
| 0 - 9 | N |

| CERTAINTY SCORES FOR ID DECISIONING - SORTED BY CERTAINTY SCORE |||||| 
|---|---|---|---|---|---|
| PROCESS RESULTS |||| CERTAINTY SCORE ||
| ACRO | METRONET | CHOICEPOINT | TRADE LINE TEST | STANDARD | CUSTOM |
| B | B | B | B | 100 | |
| B | B | R | B | 95 | |
| B | R | B | B | 95 | |
| R | B | B | B | 95 | |
| B | B | P | B | 91 | |
| B | B | N | B | 90 | |
| B | R | R | B | 90 | |
| R | B | R | B | 90 | |
| R | R | B | B | 90 | |
| B | R | P | B | 86 | |
| R | B | P | B | 86 | |
| B | R | N | B | 85 | |
| B | P | B | B | 85 | |
| R | B | N | B | 85 | |
| R | R | R | B | 85 | |
| P | B | B | B | 85 | |
| R | R | P | B | 81 | |
| B | B | B | R | 80 | |
| B | P | R | B | 80 | |
| B | N | B | B | 80 | |
| R | R | N | B | 80 | |
| R | P | B | B | 80 | |
| P | B | R | B | 80 | |
| P | R | B | B | 80 | |
| B | P | P | B | 76 | |
| P | B | P | B | 76 | |
| B | B | R | R | 75 | |
| B | R | B | R | 75 | |
| B | P | N | B | 75 | |
| B | N | R | B | 75 | |
| R | B | B | R | 75 | |
| R | P | R | B | 75 | |
| R | N | B | B | 75 | |
| P | B | N | B | 75 | |
| P | R | R | B | 75 | |
| B | B | P | R | 71 | |
| B | N | P | B | 71 | |
| R | P | P | B | 71 | |
| P | R | P | B | 71 | |
| B | B | N | R | 70 | |
| B | R | R | R | 70 | |
| B | N | N | B | 70 | |
| R | B | R | R | 70 | |
| R | R | B | R | 70 | |
| R | P | N | B | 70 | |
| R | N | R | B | 70 | |
| P | R | N | B | 70 | |
| P | P | B | B | 70 | |
| B | R | P | R | 66 | |

FIG. 23

CERTAINTY SCORES FOR ID DECISIONING

| PROCESS RESULTS | | | | CERTAINTY SCORE | |
|---|---|---|---|---|---|
| ACRO | METRONET | CHOICEPOINT | TRADE LINE TEST | STANDARD | CUSTOM |
| R | B | P | R | 66 | |
| R | N | P | B | 66 | |
| B | R | N | R | 65 | |
| B | P | B | R | 65 | |
| R | B | N | R | 65 | |
| R | R | R | R | 65 | |
| R | N | N | B | 65 | |
| P | B | B | R | 65 | |
| P | P | R | B | 65 | |
| P | N | B | B | 65 | |
| R | R | P | R | 61 | |
| P | P | P | B | 61 | |
| B | P | R | R | 60 | |
| B | N | B | R | 60 | |
| R | R | N | R | 60 | |
| R | P | B | R | 60 | |
| P | B | R | R | 60 | |
| P | R | B | R | 60 | |
| P | P | N | B | 60 | |
| P | N | R | B | 60 | |
| B | P | P | R | 56 | |
| P | B | P | R | 56 | |
| P | N | P | B | 56 | |
| B | B | B | P | 55 | |
| B | P | N | R | 55 | |
| B | N | R | R | 55 | |
| R | P | R | R | 55 | |
| R | N | B | R | 55 | |
| P | B | N | R | 55 | |
| P | R | R | R | 55 | |
| P | N | N | B | 55 | |
| B | N | P | R | 51 | |
| R | P | P | R | 51 | |
| P | R | P | R | 51 | |
| B | B | B | N | 50 | |
| B | B | R | P | 50 | |
| B | R | B | P | 50 | |
| B | N | N | R | 50 | |
| R | B | B | P | 50 | |
| R | P | N | R | 50 | |
| R | N | R | R | 50 | |
| P | R | N | R | 50 | |
| P | P | B | R | 50 | |
| B | B | P | P | 46 | |
| R | N | P | R | 46 | |
| B | B | R | N | 45 | |
| B | B | N | P | 45 | |
| B | R | B | N | 45 | |
| B | R | R | P | 45 | |

| CERTAINTY SCORES FOR ID DECISIONING ||||||
|---|---|---|---|---|---|
| PROCESS RESULTS |||| CERTAINTY SCORE ||
| ACRO | METRONET | CHOICEPOINT | TRADE LINE TEST | STANDARD | CUSTOM |
| R | B | B | N | 45 | |
| R | B | R | P | 45 | |
| R | R | B | P | 45 | |
| R | N | N | R | 45 | |
| P | P | R | R | 45 | |
| P | N | B | R | 45 | |
| B | B | P | N | 41 | |
| B | R | P | P | 41 | |
| R | B | P | P | 41 | |
| P | P | P | R | 41 | |
| B | B | N | N | 40 | |
| B | R | R | N | 40 | |
| B | R | N | P | 40 | |
| B | P | B | P | 40 | |
| R | B | R | N | 40 | |
| R | B | N | P | 40 | |
| R | R | B | N | 40 | |
| R | R | R | P | 40 | |
| P | B | B | P | 40 | |
| P | P | N | R | 40 | |
| P | N | R | R | 40 | |
| B | R | P | N | 36 | |
| R | B | P | N | 36 | |
| R | R | P | P | 36 | |
| P | N | P | R | 36 | |
| B | R | N | N | 35 | |
| B | P | B | N | 35 | |
| B | P | R | P | 35 | |
| B | N | B | P | 35 | |
| R | B | N | N | 35 | |
| R | R | R | N | 35 | |
| R | R | N | P | 35 | |
| R | P | B | P | 35 | |
| P | B | B | N | 35 | |
| P | B | R | P | 35 | |
| P | R | B | P | 35 | |
| P | N | N | R | 35 | |
| B | P | P | P | 31 | |
| R | R | P | N | 31 | |
| P | B | P | P | 31 | |
| B | P | R | N | 30 | |
| B | P | N | P | 30 | |
| B | N | B | N | 30 | |
| B | N | R | P | 30 | |
| R | R | N | N | 30 | |
| R | P | B | N | 30 | |
| R | P | R | P | 30 | |
| R | N | B | P | 30 | |
| P | B | R | N | 30 | |

FIG. 25

| CERTAINTY SCORES FOR ID DECISIONING ||||||
|---|---|---|---|---|---|
| PROCESS RESULTS |||| CERTAINTY SCORE ||
| ACRO | METRONET | CHOICEPOINT | TRADE LINE TEST | STANDARD | CUSTOM |
| P | B | N | P | 30 | |
| P | R | B | N | 30 | |
| P | R | R | P | 30 | |
| N | B | B | N | 30 | |
| N | B | B | N | 30 | |
| N | B | B | N | 30 | |
| N | B | B | N | 30 | |
| B | P | P | N | 26 | |
| B | N | P | P | 26 | |
| R | P | P | P | 26 | |
| P | B | P | N | 26 | |
| P | R | P | P | 26 | |
| B | P | N | N | 25 | |
| B | N | R | N | 25 | |
| B | N | N | P | 25 | |
| R | P | R | N | 25 | |
| R | P | N | P | 25 | |
| R | N | B | N | 25 | |
| R | N | R | P | 25 | |
| P | B | N | N | 25 | |
| P | R | R | N | 25 | |
| P | R | N | P | 25 | |
| P | P | B | P | 25 | |
| N | B | R | N | 25 | |
| N | B | R | N | 25 | |
| N | B | R | N | 25 | |
| N | B | R | N | 25 | |
| N | B | R | N | 25 | |
| N | R | B | N | 25 | |
| N | R | B | N | 25 | |
| N | R | B | N | 25 | |
| N | R | B | N | 25 | |
| B | N | P | N | 21 | |
| R | P | P | N | 21 | |
| R | N | P | P | 21 | |
| P | R | P | N | 21 | |
| N | B | P | N | 21 | |
| N | B | P | N | 21 | |
| N | B | P | N | 21 | |
| N | B | P | N | 21 | |
| B | N | N | N | 20 | |
| R | P | N | N | 20 | |
| R | N | R | N | 20 | |
| R | N | N | P | 20 | |
| P | R | N | N | 20 | |
| P | P | B | N | 20 | |
| P | P | R | P | 20 | |
| P | N | B | P | 20 | |
| N | B | N | N | 20 | |
| N | B | N | N | 20 | |

FIG. 26

| CERTAINTY SCORES FOR ID DECISIONING ||||||
|---|---|---|---|---|---|
| PROCESS RESULTS |||| CERTAINTY SCORE ||
| ACRO | METRONET | CHOICEPOINT | TRADE LINE TEST | STANDARD | CUSTOM |
| N | B | N | N | 20 | |
| N | B | N | N | 20 | |
| N | R | R | N | 20 | |
| N | R | R | N | 20 | |
| N | R | R | N | 20 | |
| N | R | R | N | 20 | |
| R | N | P | N | 16 | |
| P | P | P | P | 16 | |
| N | R | P | N | 16 | |
| N | R | P | N | 16 | |
| N | R | P | N | 16 | |
| N | R | P | N | 16 | |
| R | N | N | N | 15 | |
| P | P | R | N | 15 | |
| P | P | N | P | 15 | |
| P | N | B | N | 15 | |
| P | N | R | P | 15 | |
| N | R | N | N | 15 | |
| N | R | N | N | 15 | |
| N | R | N | N | 15 | |
| N | R | N | N | 15 | |
| N | P | B | N | 15 | |
| N | P | B | N | 15 | |
| N | P | B | N | 15 | |
| N | P | B | N | 15 | |
| P | P | P | N | 11 | |
| P | N | P | P | 11 | |
| P | P | N | N | 10 | |
| P | N | R | N | 10 | |
| P | N | N | P | 10 | |
| N | P | R | N | 10 | |
| N | P | R | N | 10 | |
| N | P | R | N | 10 | |
| N | P | R | N | 10 | |
| N | N | B | N | 10 | |
| N | N | B | N | 10 | |
| N | N | B | N | 10 | |
| N | N | B | N | 10 | |
| P | N | P | N | 6 | |
| N | P | P | N | 6 | |
| N | P | P | N | 6 | |
| N | P | P | N | 6 | |
| N | P | P | N | 6 | |
| P | N | N | N | 5 | |
| N | P | N | N | 5 | |
| N | P | N | N | 5 | |
| N | P | N | N | 5 | |
| N | P | N | N | 5 | |
| N | N | R | N | 5 | |

FIG. 27

| CERTAINTY SCORES FOR ID DECISIONING | | | | | |
|---|---|---|---|---|---|
| PROCESS RESULTS | | | | CERTAINTY SCORE | |
| ACRO | METRONET | CHOICEPOINT | TRADE LINE TEST | STANDARD | CUSTOM |
| N | N | R | N | 5 | |
| N | N | R | N | 5 | |
| N | N | R | N | 5 | |
| N | N | P | N | 1 | |
| N | N | P | N | 1 | |
| N | N | P | N | 1 | |
| N | N | P | N | 1 | |
| N | N | N | N | 0 | |
| N | N | N | N | 0 | |
| N | N | N | N | 0 | |
| N | N | N | N | 0 | |

VALUE ASSIGNMENT TABLE

| EVENT | MAX SCORE | | ACRO | | METRONET | | CHOICEPOINT | | TRADE LINE TEST | |
|---|---|---|---|---|---|---|---|---|---|---|
| | STANDARD | CUSTOM | STANDARD | CUSTOM | STANDARD | CUSTOM | STANDARD | CUSTOM | STANDARD | CUSTOM |
| BIG HIT | 100 | | 20 | | 20 | | 10 | | 50 | |
| REGULAR HIT | 70 | | 15 | | 15 | | 5 | | 30 | |
| POSSIBLE HIT | 36 | | 5 | | 5 | | 1 | | 5 | |
| NO HIT | 0 | | 0 | | 0 | | 0 | | 0 | |

FIG. 29

CERTAINTY SCORE THRESHOLD TABLE

| CERTAINTY SCORE | ACTION |
|---|---|
| 80 - 100 | ACTION A |
| 60 - 79 | ACTION B |
| 40 - 59 | ACTION C |
| 0 - 39 | ACTION D |

FIG. 30

EQUIFAX  IDENTITY VERIFICATION CENTER

INTERACTIVE QUERY

TO APPLY FOR YOUR DIGITAL CERTIFICATE, YOU MUST ENTER THE INFORMATION REQUESTED BELOW. REQUIRED FIELDS ARE BOLD.

PERSONAL IDENTIFICATION INFORMATION
YOUR NAME
FIRST PAUL
MIDDLE M
LAST BENTON
SUFFIX
GENDER ○ FEMALE
⦿ MALE
SOCIAL SECURITY NUMBER 222 - 01 - 4141
DATE OF BIRTH MONTH 03 DAY 07 YEAR 1959
MAIDEN NAME
(IF APPLICABLE)

E-MAIL ADDRESS jsmith@abcdefg.com
(REENTER FOR CONFIRMATION) jsmith@abcdefg.com

CURRENT ADDRESS
ADDRESS 3199 BARRACK DRIVE
LINE 2
CITY ALPHARETTA
STATE GA
ZIP 30202
COUNTY/PARISH FULTON
TIME AT CURRENT ADDRESS LESS THAN 2 YEARS

FORMER ADDRESS
(REQUIRED IF CURRENT ADDRESS LESS THAN 2 YEARS)

FIG. 31

ADDRESS [8544 FULTON INDUSTRIAL BLVD]
LINE 2 [ ]
CITY [ATLANTA]
STATE [GA ▾]
ZIP [30396]
COUNTY/PARISH [FULTON]

PHONE NUMBER INFORMATION
PHONE NUMBERS MAY BE FORMATTED (nnn) nnn - nnnn, or nnn - nnn - nnnn, OR n HOME PHONE NUMBER [(770) 592 - 3673]
HAS THE AREA CODE OF YOUR HOME PHONE [NO ▾]
NUMBER CHANGED IN THE LAST 6 MONTHS?
HAVE YOU HAD YOUR CURRENT HOME PHONE [YES ▾]
NUMBER FOR MORE THAN 4 MONTHS?
IS YOUR HOME PHONE NUMBER PUBLISHED? [YES ▾]
WORK PHONE NUMBER [ ]
EXTENSION [ ]

DRIVER'S LICENSE INFORMATION
DO YOU HAVE OR HAVE YOU EVER HAD A DRIVER'S LICENSE?   ○ YES
(NUMBER AND STATE REQUIRED IF YES)   ○ NO
DRIVER'S LICENSE NUMBER [B36492014]
STATE OF ISSUE [GA ▾]
DRIVER'S LICENSE ADDRESS   ○ SAME AS CURRENT ADDRESS
(ADDRESS REQUIRED IF DIFFERENT)   ○ SAME AS FORMER ADDRESS
   ○ DIFFERENT ADDRESS

ADDRESS [ ]
LINE 2 [ ]
CITY [ ]
STATE [ . ▾]
ZIP [ ]

PLEASE ENTER THE FOLLOWING INFORMATION.
IT WILL BE USED FOR ADDITIONAL SECURITY.

FIG. 32

MOTHER'S MAIDEN NAME [ ]
YEAR OF HIGH SCHOOL GRADUATION (YYYY) [ ]
NUMBER OF SIBLINGS (INCLUDING HALF AND STEP SIBLINGS) [ ]

[SUBMIT REQUEST]  [CANCEL REQUEST]

FIG. 33

EQUIFAX     IDENTITY VERIFICATION CENTER

INTERACTIVE QUERY

1. YOUR CREDIT FILE INDICATES YOU MAY HAVE A MORTGAGE LOAN, ON OR AROUND AUGUST 1998. PLEASE CHOOSE THE CREDIT PROVIDER FOR THE FOLLOWING OPTIONS:

○ BANK OF AMERICA, FSB
   ○ DARBY BANK & TRUST CO.
   ◉ HEALTH CARE CREDIT UNION
   ○ IBEW FEDERAL CREDIT UNION
   ○ NONE OF THE ABOVE

2. PLEASE CHOOSE THE RANGE WITHIN WHICH YOUR MONTHLY PAYMENT LIES FOR THE PREVIOUSLY REFERENCED ACCOUNT. IF YOU MAKE BI-WEEKLY PAYMENTS MULTIPLY THE PAYMENT BY 2.17 TO CALCULATE THE MONTHLY PAYMENT.

○ $575 - $674
   ○ $675 - $774
   ◉ $775 - $874
   ○ $875 - $974
   ○ NONE OF THE ABOVE

3. YOUR CREDIT FILE INDICATES YOU MAY HAVE AN INSTALLMENT ACCOUNT SUCH AS BANK LOANS, ELECTRONIC/APPLIANCE ACCOUNTS, JEWELER ACCOUNTS, AUTO LOANS OPENED IN OR AROUND NOVEMBER 1994. PLEASE CHOOSE THE CREDITOR FOR THIS ACCOUNT FROM THE FOLLOWING OPTIONS:

◉ EXCEL FEDERAL CREDTI UNION
   ○ HALLMARK FINANCE CO.
   ○ INDEPENDENT BANK
   ○ JOE COOPER'S FINANCE CORP.
   ○ NONE OF THE ABOVE

FIG. 34

4. PLEASE CHOOSE THE RANGE WITHIN WHICH YOUR MONTHLY PAYMENT LIES FOR THE PREVIOUSLY REFERENCED ACCOUNT. IF YOU MAKE BI-WEEKLY PAYMENTS MULTIPLY THE PAYMENT BY 2.17 TO CALCULATE THE MONTHLY PAYMENT.

○ $375 - $424
   ◉ $425 - $474
   ○ $475 - $524
   ○ $525 - 4574
   ○ NONE OF THE ABOVE

[ SUBMIT REQUEST ]   [ CANCEL REQUEST ]

FIG. 35

EQUIFAX USER ENROLLMENT

SUBMIT ENROLLMENT REQUEST

TO ENROLL YOURSELF AND OBTAIN A CERTIFICATE TO ACCESS EQUIFAX'S SECURE NETWORK:

1. VERIFY AND SUBMIT THE USER ENROLLMENT FORM BELOW.
2. MAKE SURE YOU ENTER A CHALLENGE QUESTION OF YOUR CHOICE (e.g., "WHAT IS THE LAST 4 DIGITS OF YOUR HOME PHONE NUMBER?") AND THE CORRESPONDING CHALLENGE RESPONSE (e.g., "2145"). WHEN CHECKING YOUR ENROLLMENT STATUS LATER, YOU MUST PROVIDE THE SAME CHALLENGE RESPONSE. UNLIKE A TYPICAL PASSWORD PROTECTION, THE CHALLENGE QUESTION/RESPONSE COMBINATION IS MUCH EASIER TO RECALL AFTER A LONG PERIOD OF TIME. SINCE THE CHALLENGE RESPONSE IS CASE-SENSITIVE, YOU MAY WANT TO USE ALL LOWER-CASE OR ALL UPPER-CASE LETTERS.
3. FOLLOW INSTRUCTIONS TO BOOKMARK THE SCREEN THAT ALLOWS YOU TO CHECK YOUR ENROLLMENT STATUS LATER.
4. ON THE CHECK STATUS SCREEN, ENTER YOUR CHALLENGE RESPONSE TO CHECK THE STATUS OF YOUR ENROLLMENT REQUEST.
5. IF YOUR REQUEST IS APPROVED, YOUR CERTIFICATE WILL BE DOWNLOADED AUTOMATICALLY.
6. FOLLOW INSTRUCTIONS TO CONFIRM YOUR CERTIFICATE.

DIRECT USER ENROLLMENT

FIRST NAME: PAUL
    LAST NAME: BENTON
    E-MAIL ADDRESS: pbenton@mycmpany.com
    CHALLENGE QUESTION: [WHAT IS HASH'S FAVORITE HASH]
    CHALLENGE RESPONSE: [SHA1]

[ VERIFY AND SUBMIT ]

[ EXIT AND RE-AUTHENTICATE ]

FIG. 38

EQUIFAX

CERTIFICATE CENTRAL

CERTIFICATE CENTRAL IS THE STARTING POINT FOR ACTUAL CERTIFICATE ISSUANCE.

IF YOU HAVE QUESTIONS ON CERTIFICATE ENROLLMENT, PLEASE READ THE EQUIFAX CERTIFICATE ENROLLMENT FREQUENTLY ASKED QUESTIONS AND ANSWERS FOR FURTHER INFORMATION.

WHAT BROWSERS ARE SUPPORTED FOR CERTIFICATE ENROLLMENT?

CERTIFICATE ENROLLMENT SUPPORTS NETSCAPE NAVIGATOR 3.x, NAVIGATOR AND COMMUNICATOR 4.x, AND MICROSOFT INTERNET EXPLORER 4.x WITH JAVASCRIPT ENABLED.

EQUIFAX CERTIFICATE ENROLLMENT

MR. BENTON, TO REQUEST YOUR CERTIFICATE BASED ON YOUR SUCCESSFUL AUTHENTICATION, PRESS THE GO BUTTON.

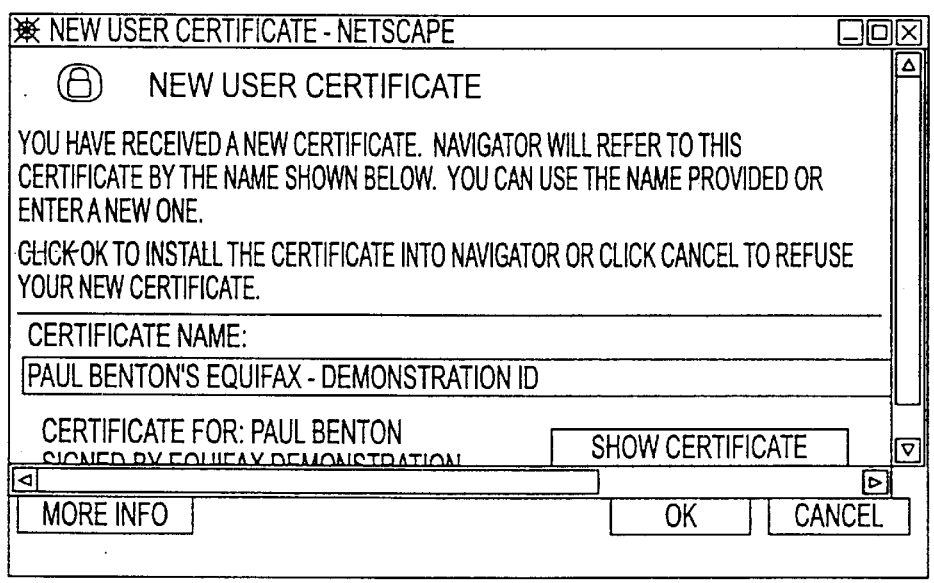

FIG. 40

SYSTEM AND METHOD FOR AUTHENTICATION OF NETWORK USERS

This application claims benefit of provisional application Ser. No. 06,086,258 filed May 21, 1998.

CROSS-REFERENCE TO RELATED APPLICATIONS

This subject matter of this application is related to the subject matter of U.S. application Ser. No. 09/315,130, entitled "SYSTEM AND METHOD FOR AUTHENTICATION OF NETWORK USERS WITH PREPROCESSING", filed May 20, 1999, and U.S. application Ser. No. 09/315,129, entitled "SYSTEM AND METHOD FOR AUTHENTICATION OF NETWORK USERS AND ISSUING A DIGITAL CERTIFICATE", filed May 20, 1999, each having the same inventors and assigned to the same assignee as this application.

FIELD OF THE INVENTION

The invention relates to electronic communications, and more particularly to authenticating the identity of network users.

BACKGROUND OF THE INVENTION

A variety of networks are used today. Computer networks include local area networks (LANs), metropolitan area networks (MANs), wide area networks (WANs), intranets, the Internet and other types of networks. Communication networks include those for conventional telephone service, cellular networks of different varieties, paging services and others. Networks are used for many purposes, including to communicate, to access data and to execute transactions. For many reasons, including security, it is often necessary to confirm or authenticate the identity of a user before permitting access to data or a transaction to occur on the network.

One known approach to computer network authentication is the use of user-specific passwords. Passwords provide some level of protection, but they are not fail-safe. One reason passwords are vulnerable is that users often share them. Even if they are kept private, someone who wants to obtain a password badly enough often can, using random generators, keyboard monitors or other techniques. Moreover, when dealing with unknown users such as people who want to conduct an electronic transaction over the Internet, ad hoc passwords are not practical.

Various non-password schemes exist that perform some level of authentication before authorizing transactions or permitting access to data These systems generally require a user to provide a sampling of basic identification information such as name, date of birth, social security number, address, telephone number and driver's license information. This sort of information, sometimes known as wallet-type information, is compared to known data such as a credit file to determine how well the user's input matches that source.

For various reasons, one-level authentication schemes are not totally reliable. In some instances, a user who provides accurate identification information may not be authenticated. This may occur, for example, because the user enters a nickname or a contraction rather than a proper name, and the authentication process does not check for a nickname or other variation. As a result, a user who should be entitled to access information or perform a transaction can not. Other inconsistencies may trigger a false negative, and often the false negative will terminate the transaction without further processing or corrective querying.

In other instances, a user who supplies fraudulent information may be authenticated. This may occur when lost or stolen wallet-type information is entered by an unauthorized user. Other situations may also lead to a false positive result. Both false positives and false negatives are undesirable.

Other reasons for unwarranted summary rejection, and other drawbacks, exist.

SUMMARY OF THE INVENTION

An object of the invention is to overcome these and other drawbacks of existing authentication systems and methods.

Another object of the invention is to provide an authentication system and method that perform a first level of authentication based on a first type of information and, based on the results of the first level of authentication, determine whether to perform at least a second level of authentication using another type of information.

Another object of the invention is to provide an authentication system and method that determine whether to perform at least a second level of authentication depending on available information and the level of certainty desired.

Another object of the invention is to provide an authentication system and method including an automatic interactive query feature.

Another object of the invention is to provide an authentication system and method which preprocess information supplied by the user to check, for example, the standardization, format, validity and internal consistency of that information before comparing it to known data.

Another object of the invention is to provide an authentication system and method which are customizable.

Another object of the invention is to provide an authentication system and method that access information from a variety of data sources.

Another object of the invention is to provide an authentication system and method that allow selection of data sources used for comparison, and the circumstances under which those comparisons are made.

Another object of the invention is to provide an authentication system and method that generate a score indicating the confidence or certainty level of authentication.

Another object of the invention is to provide an authentication system and method in which a minimum score or requirement may be set for particular data fields or sources.

In an illustrative embodiment of the invention, a user who wishes to apply for an online transaction accesses a client/server network through a client terminal. The server side of the network includes an application server communicating with an authentication server. When the user wishes to initiate the transaction or at other times, the authentication server determines whether the user's identity can be confirmed, and the level of authentication that may be accorded to the user's identity based on rules specific to the vendor accepting the transaction.

The transaction the user is applying for, such as an electronic brokerage trade, is either carried out or not carried out or other action taken depending on the results of the authentication. The extent of authentication processing performed depends upon the nature of the transaction and vendor-specific requirements. Once the authentication process has been satisfied, the invention may generate a digital certificate recording authentication levels and other information related to the user. The digital certificate can then be presented in future transactions to avoid the need to reauthenticate the user for each new transaction event For example, in the context of electronic commerce, lower risk transactions such as relatively small purchases may not require an extensive authentication process. On the other hand, more sensitive or greater risk transactions such as large purchases or sensitive data access may require a more thorough authentication process and a greater level of certainty. A greater level of security could conceivably be attained by automatically performing a thorough authentication process for every transaction. However, this approach incurs unnecessary costs or resources in cases where only a lower level of certainty is needed.

The invention avoids this drawback by enabling different levels of authentication to be performed based on the level of security desired, reducing costs and unnecessary use of system resources.

Generally in the invention, the user is authenticated according to their ability to respond to successive queries for personal information and the level of match attained from comparing the information they provide with reliable data sources. The user is initially requested to provide a first type of identification information. The first type of information is preferably wallet-type information, that is, information such as name, address, driver's license or other information that may be commonly carried on the person. This information is transmitted to the authentication server which carries out a first level authentication process on that information.

That first level authentication process compares the degree of match between the user-supplied first type of information and known data about the user from other sources. At the completion of this first level authentication process, the authentication server may allow the requested access, allow the requested access with restriction, refuse access or proceed to another level of authentication.

Preferably, the second and any additional levels of authentication request a second, non-wallet type of information from the user. The second type of information is preferably based on comparatively private information that only the user would know. For example, the second type of information may include mortgage loan or other information obtained from a credit report or another source. Such information is typically not carried with a person, and therefore the chances of fraud by someone who obtains lost or stolen information and attempts to execute a transaction are reduced.

The private financial or other data elicited in the second level authentication process may be requested using an interactive query. The interactive query may include multiple choice questions that are automatically generated based upon the information available in the known data sources. For example, the authentication server may access a credit file to identify loans of the user which are still in payback status. One or more loans may be selected and the lender's name and corresponding monthly payment amount retrieved from the credit file.

The interactive query might ask the user for the lender's name or payment amount on the identified loan and offer a number of choices for each of the lender's name and the correct payment amount, only one of which is correct. Depending upon the responses, the user's identity may be authenticated fully, or to a greater or lower degree of certainty compared with that based solely on the first level authentication process.

The invention may include a preprocessing stage executed before first or second level authentication. The preprocessing stage filters or corrects relatively minor mistakes in formatting and consistency in the user's responses, preserving the transaction for further processing and avoiding needless termination before the upper stages are reached.

BRIEF DESCRIPTION OF THE DRAWINGS

FIG. 9 illustrates an example of a verification matrix used in the invention.

FIG. 10 illustrates an example of error codes that may be generated according to the invention.

FIG. 11 illustrates an example of a preprocessing matrix used in the invention.

FIGS. 13–16 illustrate a transaction record generated according to the invention.

FIGS. 17 and 18 illustrate pattern recognition criteria used by the invention to detect irregularities.

FIG. 19 illustrates potential action taken by the invention upon detection of pattern recognition criteria.

FIG. 20 illustrates a scoring matrix for different types of accounts in second level authentication according to the invention.

FIG. 21 illustrates a relative weighting of different types of queries used in second level authentication according to the invention.

FIG. 22 illustrates a tiering of certainty scores into a set of categories according to the invention.

FIGS. 23–28 illustrate an assignment of overall certainty scores from first and second level authentication results generated according to the invention, from highest to lowest.

FIG. 29 illustrates a tiering of authentication results for different types of source accounts according to the invention.

FIG. 30 illustrates action thresholds for a set of different actions according to the invention.

FIGS. 31–33 illustrate preprocessing and first level authentication queries in an example authentication session according to the invention.

FIGS. 34–36 illustrate second level authentication queries in an example authentication session according to the invention.

FIGS. 37–40 illustrate queries used to issue a digital certificate according to the invention.

DETAILED DESCRIPTION OF PREFERRED EMBODIMENTS

The invention in general operates in a network environment and provides a system and method to authenticate a network user's identity using a hierarchy of information queries. The invention may draw on information from one or more data sources to execute the hierarchy of authentication stages, depending upon the transaction or data sensitivity. The invention may dynamically adjust the extent of authentication necessary, based upon preset thresholds or upon tests of input validity as the user supplies that information.

Figure 1:
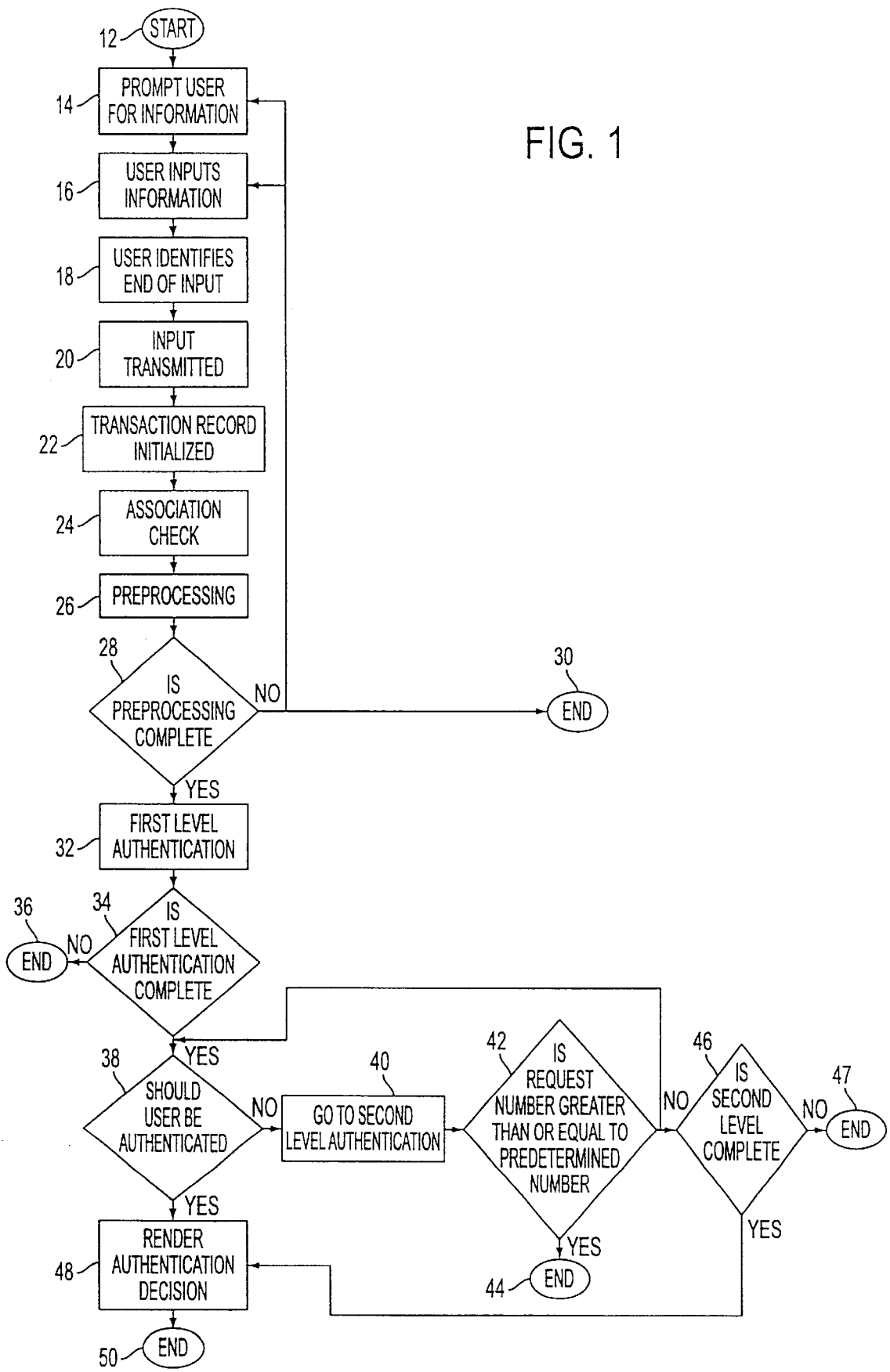
FIG. 1 is a flowchart of an overall process for authenticating users according to the invention.
Figure 2:
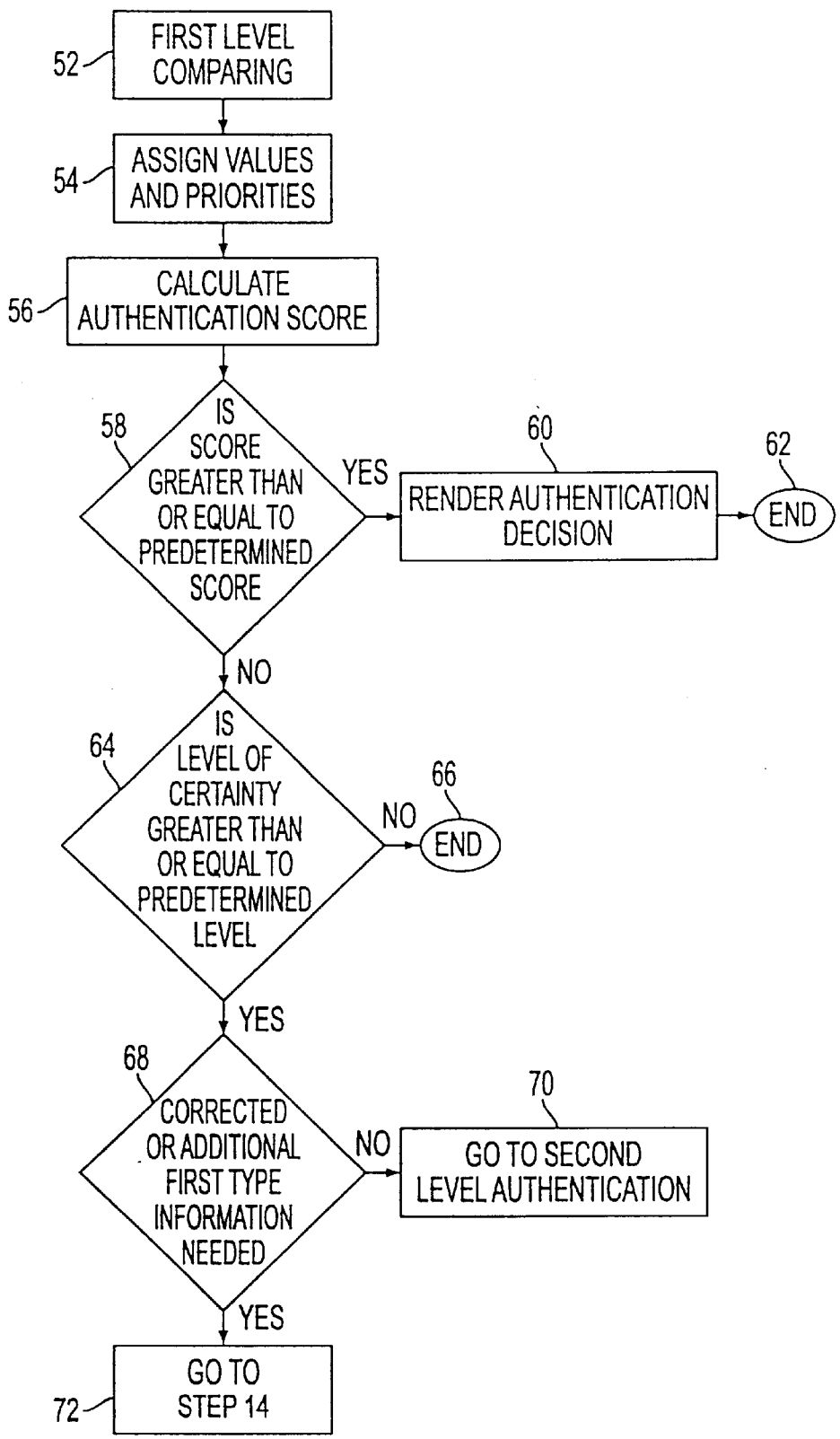
FIG. 2 is a flowchart of an overall processing flow for authenticating users according to the invention in another aspect.
Figure 45:
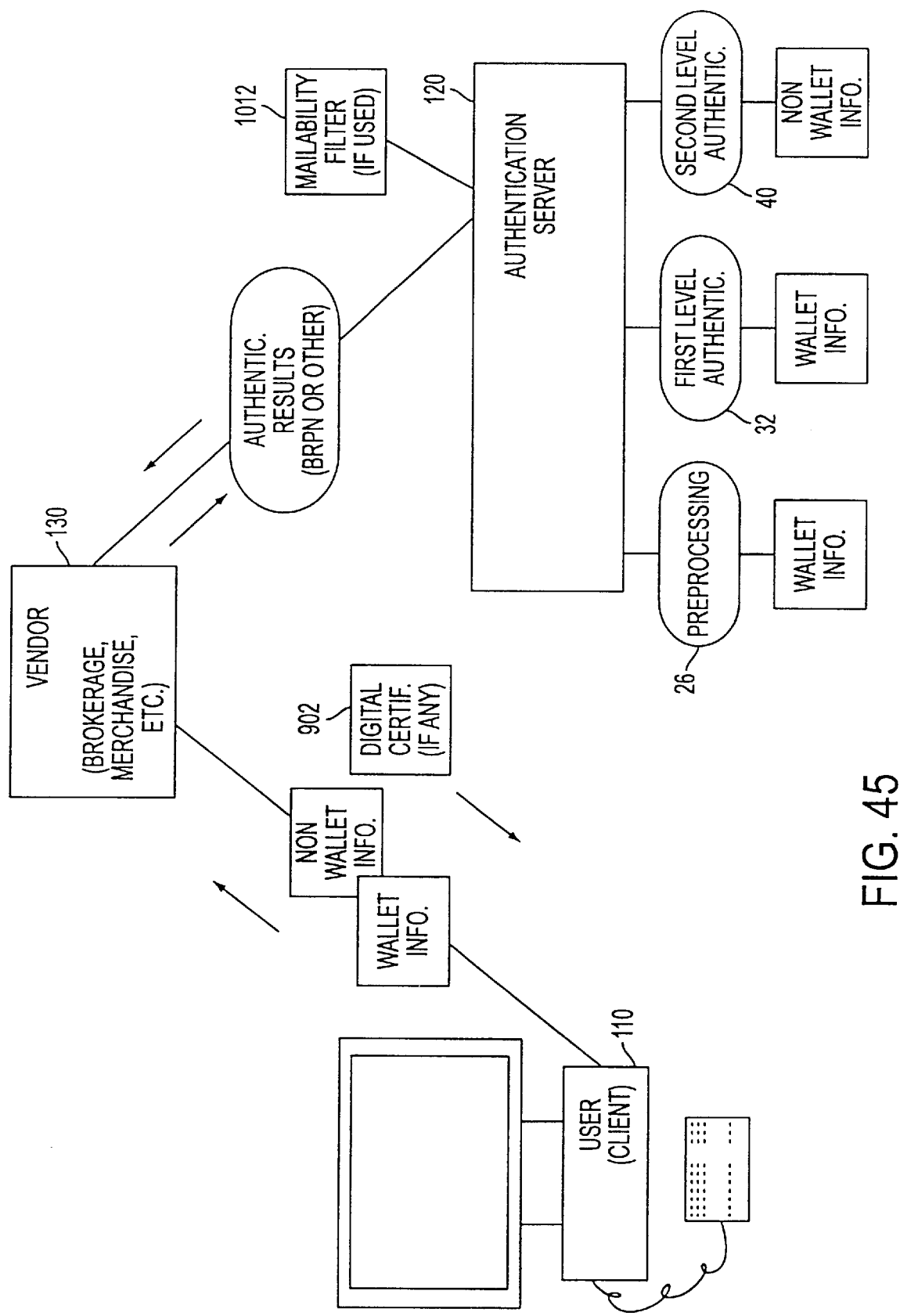
FIG. 45 illustrates a block diagram of an overall system according to the invention, in another aspect.

A front-end preprocessing stage may serve to filter or correct erroneous information such as mistaken zip codes, missing digits or other matters of form so that the transaction may be preserved without needless termination before first or second level authentication. At the conclusion of the authentication process, the invention may issue a digital certificate to the user's machine to record authentication information, to present for later transactions or to update. An illustration of the overall architecture of the invention is in FIG. 45, and flowcharts of the overall processing flow are shown in FIGS. 1 and 2.

Figure 12:
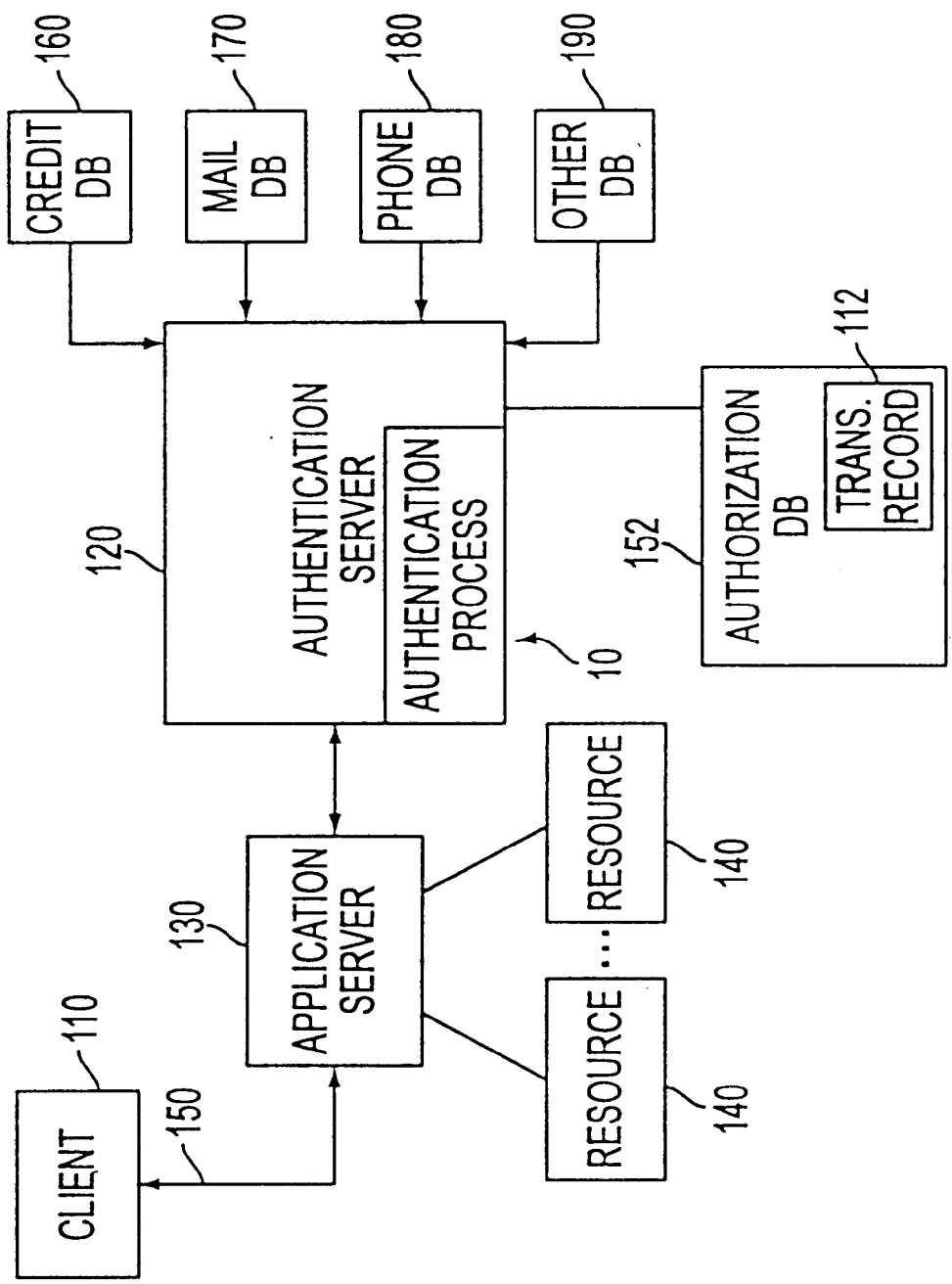
FIG. 12 illustrates a block diagram of an overall system according to the invention.

In terms of the network environment of the invention, in an embodiment illustrated in FIG. 12, client 110 communicates with application server 130 over a physical or wireless transmission link 150. Transmission link 150 may be a direct Internet connection or include the Internet as an intermediate segment. Transmission link 150 may include a dial-up Internet connection, dial-in server access, an intranet connection, a T1 or T3 digital line, an ISDN digital line, LAN connection, a wide area network, Ethernet, DSL connection or other wired or wireless connection.

In an Internet context, application server 130 preferably contains Internet server software (such as the publicly available Apache package or others) communicating with a browser application resident on client 110, which may be a personal computer or workstation running the Microsoft Windows™ 95 or 98 operating systems, Internet access device such as a WebTV™ unit, or other hardware or software.

The system includes an authentication server 120 on which the authentication process 10 of the invention is resident and executes. Authentication process 10 may be for instance implemented in programmed machine instructions, such as in C, C++, Java or other compiled, interpreted or other computer programming languages. In an alternative embodiment, authentication process 10 may be coresident on application server 130, obviating the need for authentication server 120. Authentication server 120 and application server 130 each may each be a workstation or personal computer, for instance running the Unix, Linux or Microsoft Windows™ NT™ operating systems or other hardware and software, and each may communicate with various databases to obtain user identification information for first and second level authentication.

As illustrated in FIG. 12, such databases may include a credit database 160, mail database 170, phone database 180 and one or more other databases 190 which may be directly or indirectly accessible by or resident on authentication server 120 or application server 130. In addition, authorization database 152 is associated and communicates with authentication server 120. Authentication process 10 preferably receives and stores data to and from the authorization database 152, including transaction record 112 (illustrated in FIGS. 13–16) which logs user input, queries and other information as a temporary or permanent record.

FIG. 12 also shows one or more resources 140 which are accessible to application server 130. These may include, for example, databases, other computers, electronic memory, CD ROMs, RAID storage, tape or other archival storage, routers, terminals, and other peripherals and resources.

According to the invention, a user who wants to access information or process a transaction over a network is prompted to submit information to authentication process 10 through client 110. Authentication process 10 invokes the preprocessing step 26, in which the user is prompted to supply a first type of user identification information. The first type of user identification information preferably comprises wallet-type information such as name, address, phone number, social security number, driver's license number and other common personal information.

This information is supplied to authentication process 10 via application server 130, in a standard application format, by client 110. In one aspect of the invention, application server 130 may be operated by an online vendor, such as a brokerage firm, merchandise retailer or other (see e.g. FIG. 45) and serves as a conduit between client 110 and authentication server 120 once authentication process 10 is invoked. It is possible however for client 110 and authentication server 120 to communicate the requested data directly without passing through application server 130.

The user inputs the first type of information requested into client 110. Data may be queried from the user through textual questions, graphical user interfaces (GUIs), hyper text markup (HTML) forms or any other suitable mechanisms, either in a real-time interactive environment or through a batch submission. Selection of the input mode may depend upon various factors such as resource loading and availability, business model, user and system traffic and transaction criticality.

Following the initialization of the transaction record 112, the association check 24 may be executed. Before entering the preprocessing step 26, the authentication process may invoke association check 24 to evaluate whether the request under consideration is associated with other requests or attempts, whether recent, concurrent or otherwise. The purpose of the association checks is to filter requests suspected to be fraudulent or part of an attack of some kind. Pattern recognition (illustrated in FIGS. 17 and 18) may be used to identify requests which should be identified as having a fatal defect or potential for fraud, requiring immediate rejection of the request.

In a preferred embodiment, authentication process 10 stores information received through all requests in the authorization database 152, which stores transaction record 112 logging all input received from the user. Using this information, association checks based upon available data are facilitated. For example, if one attempt at access includes a name and an associated social security number, a concurrent or later request with the same name but a different social security number may be denied or flagged for further authentication.

Conversely, if the later request includes a different name but the previously submitted social security number, the request may also be denied or flagged for further authentication. Association checks can examine any data provided by the user before or during the preprocessing step 26.

After association check 24, the preprocessing step 26 may occur at one or more of authentication client 110, authentication server 120 and application server 130. Preprocessing step 26 at client 110 may be effected through the use of, for example, the transmission of Java applets to client 110 or through other software resident or executing on client 110. Thus, although authentication process 10 is shown in FIG. 12 to be resident on authentication server 120, portions or all of authentication process 10 may be distributed elsewhere.

One advantage of the preprocessing step 26 is that it processes as much of the requested data as possible before retrieving data from separately stored data sources such as credit files, which can be expensive in terms of processing resources, time and cost. Those separate data files may be accessible via the Internet or other networks, may be owned by separate entities and may involve a per-access charge. The preprocessing step 26 involves in one regard assuring that data formatting is consistent between the information supplied by the user and what is expected in the databases.

Preprocessing step 26 thus helps to ensure that the supplied data is as accurate as possible to increase the likelihood of generating a match when the user's identity is genuine. This reduces false negatives due to inconsistencies such as supplied nicknames instead of a full first name, contractions, missing titles, or mismatched formatting of social security numbers applied against known data sources.

If the data supplied by the user is determined to be not feasible, incorrect, or otherwise clearly deficient before soliciting data from the separate data sources, it is still possible to proceed to those other data sources after the user input has been revised to meet the minimum requirements without interrupting the overall transaction.

If the user does not respond to a request for a mandatory item of information (e.g., name) it is preferable to reprompt the user for that field before incurring any database charges or expending additional processing resources. Another example where interception in this manner is beneficial is when a user supplies a six digit social security number. In this case it is clear that the response is deficient and no match is possible in the social security number databases, so those databases should not be unnecessarily accessed.

In a preferred embodiment, the preprocessing step 26 may perform one or more of the following validation checks.

1) Standard Field Checks. To ascertain whether all required information fields are present and in the proper format and if not, reprompt for them or reformat them as necessary to proper form.

2) Social Security Check. The input social security number is compared with one or more published social security number tables or processed using one or more algorithms to determine its validity. These tables may include such information as numbers reported as deceased or fraudulent.

3) Address and Telephone Checks. The address and telephone number provided are verified for consistency (i.e., city, state, and zip code agree; area code agrees with state) and the user's address is standardized. Standardization allows for more accurate matching with other databases at later stages of authentication process 10. During the preprocessing step 26, rejection or flagging for additional authentication may occur as a result of mismatches.

4) Driver's License Validation Check. The input driver's license number is processed to verify that the number is valid for the state of issue. These algorithms may be obtained through departments of motor vehicles or otherwise.

The following information is preferably prompted for (R being required, O being optional) by authentication process 10 during preprocessing step 26 and supplied by the user:

TABLE 1

| DESCRIPTION | REQ/OPT |
|---|---|
| Last Name | R |
| First Name | R |
| Middle Initial | O |
| Suffix | O |
| Maiden Name, if applicable | O |
| Current Address (CA) | R |
| At CA < 2 Years Indicator (Y/N) | R |
| Former Address | R only if At CA < 2 Years Indicator is Y, otherwise Optional |
| Home Phone Number | R |
| Area Code Change Indicator (Y/N) | R |
| Home Phone Published Indicator (Y/N) | R |
| Work Phone Number | O |
| Gender | R |
| Date of Birth | R |
| Social Security Number | R |
| Drivers License Indicator (Y/N) | R |
| Drivers License Number (DL) | R only if DL Indicator set to Y, otherwise Optional |
| Drivers License State of Issue | R only if DL Indicator set to Y, otherwise Optional |
| Mother's Maiden Name | O |
| Year of High School Graduation | O |
| Number of Siblings | O, includes half and step siblings |
| Email Address | O |

Other, non-wallet information, which is used for subsequent levels of authentication, can be collected during preprocessing step 26 or deferred until a later phase of the authentication process 10. A user failing to supply this information during preprocessing step 26 may be reprompted for it, and processing may or may not continue in the event the user never supplies information designated as required. This information preferably includes:

TABLE 2

| DESCRIPTION | REQ/OPT |
|---|---|
| Name of Lender | R, only if Second Level Authentication used |
| Loan Account Number | O |
| Loan Type Indicator | R, only if Second Level Authentication used |
| Monthly Payment Amount | R, only if Second Level Authentication used |

Preprocessing step 26 may thus include a set of validation checks including standard field checks, social security number validation, address validation, area code validation, and driver's license validation and other preliminary data verification. It is preferable that preprocessing occur in the order presented, in part due to data dependencies of later checks on the earlier ones. However, it will be understood that the order may be rearranged, and different preprocessing checks may be employed. The enumerated validation checks are discussed in more detail in order below.

First, standard field checks preferably occur at client 110, where and when the requested data is collected, to ensure that all required data is present and all provided data is in the proper format and meets minimum requirements. Completing this processing at client 110 minimizes the number of requests that must be terminated at this early point in the authentication process due to formally incorrect data. This is particularly important when the user is not present at the time of authentication, such as when requests are submitted in batch form rather than interactively. In general, the standard field checks make sure that an expected range or format of characters are input by the user, appropriate to individual queries and data types.

The following is preferably accomplished during standard field checks:

1) All required fields must be present.
2) All provided fields must be in the proper format.
   First name must have at least one letter provided.
   Phone numbers must have 10 digits.
   Social security number must have 9 digits.
   Social security number must not have all 9 digits the same.
   Social security number's first 3 digits must not be equal to 000.
   Social security number's 4th and 5th digits must not be equal to 00.
   Social security number's last 4 digits must not be equal to 0000.
3) Specified fields must meet additional requirements.
   Age, derived from date of birth, must be 18 years old or older. (However, a telephone number and drivers license may still be verified, even if a credit file is not available)
   Email address must contain an @ sign and a ".com" or other domain.

The user is preferably afforded up to two additional attempts to correct any fields that do not meet the standard field check requirements. If any field cannot be corrected after a total of three attempts, the authentication process 10 is preferably aborted. If the request has been successfully completed as determined by the standard field check portion of preprocessing step 26, the request may continue to the next preprocessing check.

At that next stage of standard field checks, the social security number may be checked for some or all of the following:

Social security number contains 9 digits
Social security number ≠ 000000000, 11111111, . . . , 999999999.
Social security number first 3 digits ≠000
Social security number 4th and 5th digits ≠00
Social security number last 4 digits ≠0000
Social security number does not match any social security number found on the Social security number fraud table.
Social security number is in the issued range as determined by a lookup on the social security number range table.
Date of birth agrees with the social security number issue dates.

The check against the published social security number fraud table is used to ensure that the supplied social security number is not listed as fraudulent. Such a table may be obtained from any of a number of sources including, for example, credit reporting companies or law enforcement agencies. The social security number range table is used to ensure that the supplied social security number is not an invalid number. Such a table may be obtained from any of a number of sources including, for example, governmental agencies.

Once it has been determined that the social security number has been issued, and a range of issue dates is known, the date of birth provided on the request can be compared to the date range for consistency. It is thus possible to perform another check to ensure that the social security number is valid based upon date of birth information.

The user is preferably given only one additional attempt to correct social security number information that has been rejected by social security number validation checking. If the social security number cannot be accepted after a total of two tries, authentication process 10 is preferably aborted.

Next, the validity of address information is confirmed, preferably using an address correction and standardization package (such as the PostalSoft package available from First Logic Corp.). For current address, and former address if provided, the package may:

Verify that the city, state and zip code agree. If only a city and state are provided, the package may be able to add the zip code. If only a zip code is provided, the package usually can add the city and state.
Standardize the address line. The package can correct misspelled street names, fill in missing information and strip out unnecessary punctuation marks and spaces.
Identify undeliverable addresses (i.e., vacant lots, condemned buildings, etc.).
Create a status code that tells how an input address had to be corrected.
Create an error code that tells why an input address could not be matched, or assigned.

Responses, or actions, for each of the possible address-related status codes or error codes in error code matrix 156 (illustrated in FIGS. 9–11) are provided as output during the preprocessing step 26. The user is preferably given only one additional attempt to correct each address that has been rejected by address validation. If the address cannot be corrected after a total of two attempts, the request proceeds as designated in the response matrix 154 illustrated in FIGS. 9–11. The response matrix 154 may be located on authentication server 120, in authorization database 152 or elsewhere and serve to associate messages with test results and transaction records during the address portion of preprocessing step 26, concurrently with overall application processing.

In other words, the response matrix 154 sends messages to client 110 based upon specific verification tests or based upon the current status of the transaction record 112. For example, the message may prompt the user to verify that data which was input is correct or a message to direct the user to call customer service for manual intervention. The response matrix 154 is preferably parameter driven, so that appropriate messages can be associated with particular events.

The area code for the home phone number is preferably checked to determine if it is valid for the state supplied in the current address, in preprocessing step 26. The area code and state provided in connection with the request are compared with an entry for the area code in an area code table, available from database and other sources. The area code table contains area code information for each of the area code locations in the geographic area being served.

The database for the area code and associated information may be preferably implemented, for example, using the commercially available MetroNet package. The phone number database information may be stored in phone database 180 connected to authentication server 120, or otherwise. The consistency of area code to state of residence may, for instance, be checked.

The user is preferably given only one additional attempt to correct home phone number information that has been rejected by the area code validation check. After the home phone number has been accepted or after a total of two tries, the process indicates the result, valid or not valid, in the transaction record 112 and proceeds.

Next, the drivers license number is checked to ensure that the format of the number is consistent with the format for the state of issue. An algorithm may look up the state of issue and compare the driver's license number provided in the request with the accepted format for the state. The user is preferably given only one additional attempt to correct driver's license number information that has been rejected by the driver's license check (or may be terminated immediately, according to vendor preference). After the driver's license number has been accepted or after a total of two tries, the authentication process 10 indicates the result, valid or not valid, in the transaction record 112 and proceeds.

In the event the user will be paying for a product or service with a credit card, authentication process 10 may invoke credit card verification at this point. In this case, checks may be executed against a credit card database. These checks may include ensuring that the available credit line is sufficient to make the purchase, ensuring that the billing address for the credit card in the database matches the submitted address, and ensuring that the credit card is not stolen. Databases presenting this sort of information are commercially available.

Preprocessing step 26 thus may include internal corrections as well as comparisons of user-supplied data to known data which may be obtained from separate sources. Those sources may be third party databases such as commercial or government databases, or internal databases. Preferably, however, preprocessing step 26 is limited to checking user-supplied data against wallet-type data which is relatively conveniently, and locally, accessed. Preprocessing step 26 consequently offers increased certainty of authentication by using additional databases and requiring internal consistency as a predicate to first and second level authentication.

In conjunction with the checks carried out by preprocessing step 26, credit database 160 may be any suitable consumer credit history database available from various sources including credit reporting companies such as Equifax™. Mail database 170 and phone database 180 may be any suitable databases providing address and telephone information for the relevant geographic area (e.g., MetroMail which is a compendium of regional Bell operating company-supplied information). Other databases 190 may include, for example, a check services drivers license database which provides information concerning check validity. Any commercially available or internal database or others may be employed in processing the verification substeps of the preprocessing step 26.

Additionally, the checks of preprocessing step 26 may include the use of a credit card application fraud model, or some other model which statistically analyzes response data. For example, the data supplied by the user may be modeled and graded for confidence level based upon empirical models supplied by third party vendors or available internally. An illustration of pattern recognition criteria that may be employed in this regard by the invention is illustrated in FIGS. 17 and 18. As illustrated in those figures, in general the invention monitors user input recorded in transaction record 112 or otherwise for repetitive attempts at authentication, which may represent attempted fraud or some type of network attack.

In such instances, and as illustrated in pattern recognition criteria matrix 904 shown in FIG. 17, the input may include valid portions of information such as a social security number but varying unsuccessful attempts to find valid input for other fields. At any time during authentication process 10, the invention may preempt the authentication event and terminate the session when pattern recognition senses a significant probability of irregularity. Different responses to different types of detected potential fraudulent transactions are shown in the pattern recognition match action matrix 912 of FIG. 19. As illustrated in the figure, different types of inconsistencies may result in different actions, including the locking out of suspected fraudulent entries for such patterns as the same name under varying email addresses. Other inconsistencies may result in the starting of the authentication process 10 over again (QILT entries) at user request.

In a preferred embodiment of the invention, the data supplied by the user must match a record from at least two data sources to graduate from the preprocessing step 26. This increases the level of certainty that the user's identity is genuine before graduating from that stage. Matching routines, implemented for each data source and type of check, compare query data to known source data and preferably assign a value to every match instance. This value may be termed an authenticity certainty score. An authenticity certainty score may be accumulated based upon the collective values assigned for each match instance of preprocessing step 26. The authenticity certainty score may be employed and compared against predetermined thresholds to determine the next action for the request (i.e., approve, approve with restrictions, deny, go to first or other level preprocessing).

If the data provided by the user does not meet the requirements of some or all of the checks of preprocessing step 26, a message may be returned to the user via link 150 requesting the data in question be corrected and resubmitted. Upon resubmission, the input data will again be analyzed. Alternatively, authentication process 10 may be preconfigured to immediately reject a request based upon a failure to satisfy a minimum level during preprocessing step 26.

If the request is identified as a result of the association check 24 or other analysis as possibly fraudulent using the association check or otherwise, a message may be returned to client 110 indicating that the request cannot be processed automatically and that manual processing such as calling customer service is necessary.

Biometric data may be employed either alone or in combination with the above preprocessing as well as subsequent authentication levels to ensure the identity of a user. That biometric data may include, for example, fingerprint information from the user, captured in analog or digital form, for instance, via an imprint peripheral connected to client 110. Biometric data may also include infrared or other retinal or iris scans, or finger or hand geometry matches. Likewise, biometric data used by the invention may also include handwriting recognition, voice recognition using digitized sampling or other means or facial recognition input from video or other devices.

The biometric data may also include DNA database matching. In general, any biometric technology now existing or developed in the future may be incorporated in the invention. The biometric data may be used as input fields or records in the preprocessing, first or second authentication level stages. Alternatively, biometric data may be used as a key to unlock and release a digital certificate 902 issued to the user, to be stored on client 110 or otherwise.

FIG. 1 is a flowchart illustrating the overall authentication process according to the invention. Authentication process 10 starts at step 12. The authentication process 10 prompts a user for first level information at step 14. Again, the first type of information is preferably wallet-type information, that is, information such as name, address, driver's license or other information commonly carried on the person. The user inputs that first level information via a keyboard, mouse, voice digitizer or other suitable input mechanism at step 16. Step 18 identifies that the user has completed first level information input. Step 20 transmits the input. The transaction record 112 is initialized at step 22.

Step 24 performs an association check on the information input by the user. Authentication process 10 may then invoke the preprocessing step 26 discussed above. If preprocessing step 26 is included, step 28 may also be provided, which determines whether preprocessing step 26 is complete. If preprocessing step 26 is not complete, authentication process 10 may return to step 14 to prompt the user for omitted, corrected or additional information, return to step 16 to allow the user to input information, or end authentication process at step 30. If preprocessing step 26 is complete, authentication process 10 proceeds to step 32 of first level authentication.

Authentication process 10 matches, at step 32, the first type of information input by the user with information received from one or more separate data sources. Based on that comparison, authentication process 10 determines whether the first level authentication is complete at step 34. If the first level authentication is not complete, authentication process 10 may return to step 14 to prompt the user for omitted, corrected or additional information, return to step 16 to allow the user to input information, or end authentication process at step 36.

If the first level authentication is complete, authentication process 10 determines at step 38 whether the user should be authenticated. If the user has not been rejected outright but has not yet been authenticated, authentication process 10 proceeds to step 40, second level authentication. Step 40 request and tests the user's input of a second type of information, which is preferably non-wallet type information.

Authentication process 10 determines whether a request for information has been repeated more than a predetermined number of times at step 42. If the attempt exceeds the predetermined limit, authentication process 10 ends at step 44. If the attempt does not exceed the predetermined limit, authentication process 10 determines whether step 40 is complete at step 46. If step 40 is complete, authentication process 10 renders an authentication decision at step 48, then ends at step 50. If step 40 is not complete, authentication process may return to step 38 or end at step 47.

FIG. 2 is a flowchart illustrating the process of the first level authentication step 32 in more detail. First level authentication process 32 initiates at first level comparing step 52. The first level comparing step 52 compares the information input by the user with information about the user retrieved from one or more known data sources. The user may be queried in the first level authentication step 32 for similar information to that accepted during the preprocessing step 26, or for refined or additional information. During processing of any user-input phone number information in the first level authentication step 32 after preprocessing step 26 (but preferably not in preprocessing step 26 itself), if the user indicates that they have been at the home telephone number for less than four months, the home telephone number and related source information may be preferably further checked against an electronic directory assistance source, for better currency as compared to an offline database. During processing of any user-input driver's license information in the first level authentication step 32 (but preferably not in preprocessing step 26), any further checks against the driver's license database may be preferably implemented, for example, using the commercially available ChoicePoint drivers license database. Information from that external database is generally derived from official department of motor vehicle records or insurance claims information, the content of which may vary by state of issue. Step 54 assigns values and priorities to each response input by the user. Information that is of greater significance may be assigned a higher value or priority.

The transaction record 112 (illustrated in FIGS. 13–16) initialized in step 22 is used throughout the authentication process 10 to keep track of user input and authentication results. After the appropriate queries have been processed and all results stored in the transaction record 112, the transaction record 112 is used to determine an authentication score with respect to the request. Step 56 calculates the total authentication score, and optionally, a score for each data source, data field, etc. The results are categorized as a big hit (B), a regular hit (R), a possible hit (P), or no hit (N) depending on results. Those results may then be combined with the results of second level authentication process 40 to determine an overall authenticity certainty score, as illustrated in FIGS. 23–28 and discussed below.

Authentication process 10 determines whether one or more of the authentication scores is greater than or equal to a predetermined authentication value or threshold at step 58. If the authentication scores are greater than or equal to the predetermined authentication value, authentication process 10 renders an authentication decision at step 60 and then ends at step 62.

If one or more of the scores are less than their corresponding predetermined authentication value, authentication process 10 determines whether the level of certainty meets a predetermined certainty level at step 64. If the level of certainty is below the predetermined certainty level, authentication process 10 ends at step 66. Otherwise, authentication process 10 determines whether corrected or additional first type information is needed at step 68. If no other information is needed, authentication proceeds to step 40, second level authentication. If user input information needs to be revised, authentication process 10 may return to step 14 or step 16.

FIGS. 31–33 illustrate a set of queries associated with preprocessing step 26 and first level authentication 32 in an example authentication session according to the invention. As can be seen in the figures, these phases of the invention query for and process wallet-type information to reach a first level of confidence about the genuineness of the user's identity.

Figure 3:
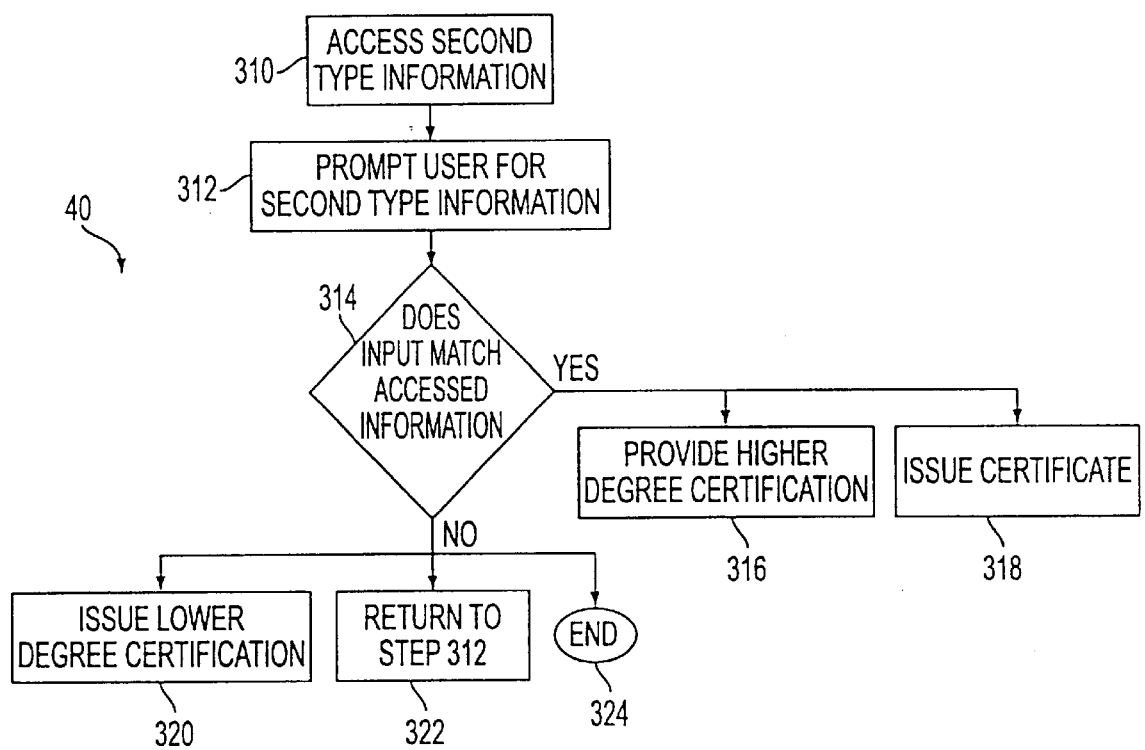
FIG. 3 is a flowchart of certain aspects of second level authentication according to the invention.

FIG. 3 is a flowchart illustrating the second level authentication process 40 in more detail. Second level authentication process 40 begins with step 310. Step 310 accesses available second type information from data sources, such as a credit file. Step 312 prompts the user for second type information from within that determined to be available in step 310. Step 314 determines whether the user input matches the accessed information.

In the execution of second level authentication process 40, authentication server 120 may access credit database 160. Credit database 160 may be preferably implemented, for example, using a commercially available Equifax™ consumer credit file, in the ACRO file format.

Inquiries may be transmitted back and forth between application server 130 and authentication server 120 during second level authentication process, using the System-to-System 93 (STS) inquiry format for these types of data files, as will be appreciated by persons skilled in the art. Credit line information returned from credit database 160 may be in System-to-System file fixed format (FFF), consistent with the ACRO file configuration. Second level authentication process 40 executes the search against credit database 160 to match the user's input against data in that file.

The search maybe carried out according to the ACRO L90 search format, with results again categorized as a big hit (B), a regular hit (R), a possible hit (P), or no hit (N) depending on results, which in one embodiment are returned to authentication server 120 starting in ACRO header segment position 285 in a 13 byte segment. Matches or no matches are returned as logical flags within that header segment.

If the information matches, authentication process 10 either provides a higher degree authentication in step 316 or issues another degree of authentication in step 318. If the information does not match, authentication process 10 may issue a lower degree authentication, return to step 312 or end at step 324.

An example of point scoring used in second level authentication according to the invention is illustrated in FIGS. 20 and 21. The scoring matrix 906 of FIG. 20 includes a set of point values for point values related to trade line accounts which the user may have, on a sliding scale according to the relative degree of significance of various accounts. In general, and as indicated in the relative weight matrix of FIG. 21, the proper identification of a lender name is given greater weight compared to monthly payment amount or terms of account data.

In FIG. 22, the resulting certainty scores are ranked according to four categories of big hit (B), regular hit (R), probable hit (P), and no hit (N). Different combinations of accounts may lead to different maximum scores, according to the reliability or significance of the accounts available for second level authentication step 40.

Upon completion of both the first level authentication step 32 and second level authentication step 40, results of all checking may be assembled to determine an overall authenticity certainty score, values for which are illustrated in the overall certainty scoring matrix 918 of FIGS. 23–28. In general in those figures, big hits on credit file (second level authentication) checks contribute to higher overall certainty scores, which are normalized to 0 to 100. However, preferably no single check qualifies or disqualifies a user from authentication.

Rather, according to the invention the aggregate weighting of all the user's response is factored into a variety of possible score ranges, depending on how highly the information they supplied correlates to the entire collection of data sources used by the invention. The scoring levels may be aggregated as shown in the assignment matrix 920 of FIG. 29 to develop a tiered categorization (B, R, P, N) for all levels of authentication, and generate responses according to threshold table 922 as illustrated in FIG. 30. While particular numerical levels are shown in those matrices, it will be appreciated that the different scores and tiers are selectable or scalable according to application needs, in the invention.

Figure 36:
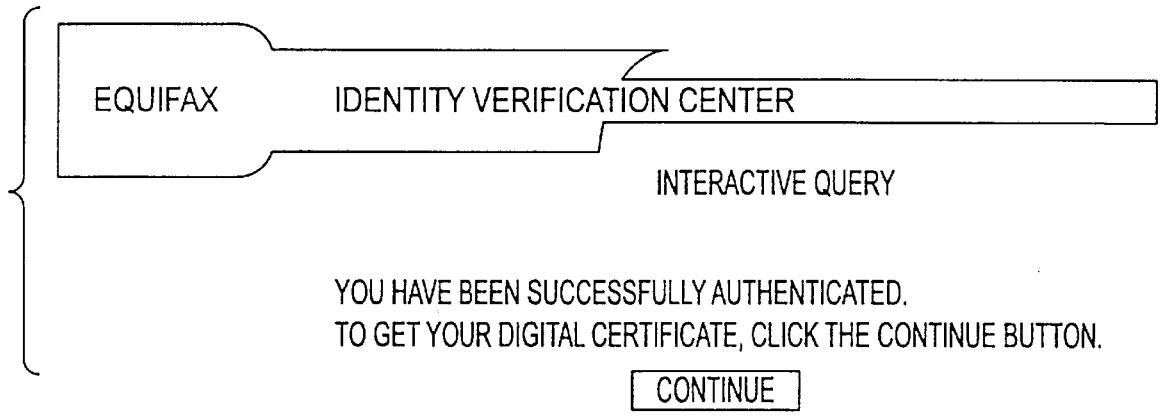

FIGS. 34–36 illustrate a set of queries in screen shot form associated with second level authentication step 40 in an example authentication session according to the invention. In general, at this stage the authentication process 10 identifies and accesses trade (credit) line information to query for data of a specific and private nature, which enhances the security profile of the user. In the example shown, both credit and merchant or trade line accounts are queried for lender identity and amounts. Accurate identification results in authentication, followed by issuance of a digital certificate 902 as desired.

The system and method of the invention are customizable to allow a vendor operating an authenticating server 120 to set various parameters, including the thresholds or predetermined levels at different points of authentication process 10. If the predetermined authentication or certainty level has not been reached for a particular data source or data field, the user may not be eligible for authentication, or a higher degree of authentication.

If a user successfully completes preprocessing, first and second authentication, in one embodiment the invention may issue a digital certificate 902 to the user, as illustrated in FIGS. 37–41. As illustrated in FIGS. 37–40, after an indication of successful authentication the user is directed to input identification and challenge or password information to generate and store digital certificate 902. The digital certificate 902 contains a set of fields including user identification, a digital certificate serial number, an expiration period, as well as information related to the issuer of the digital certificate and fingerprint data for the digital certificate.

Figure 37:
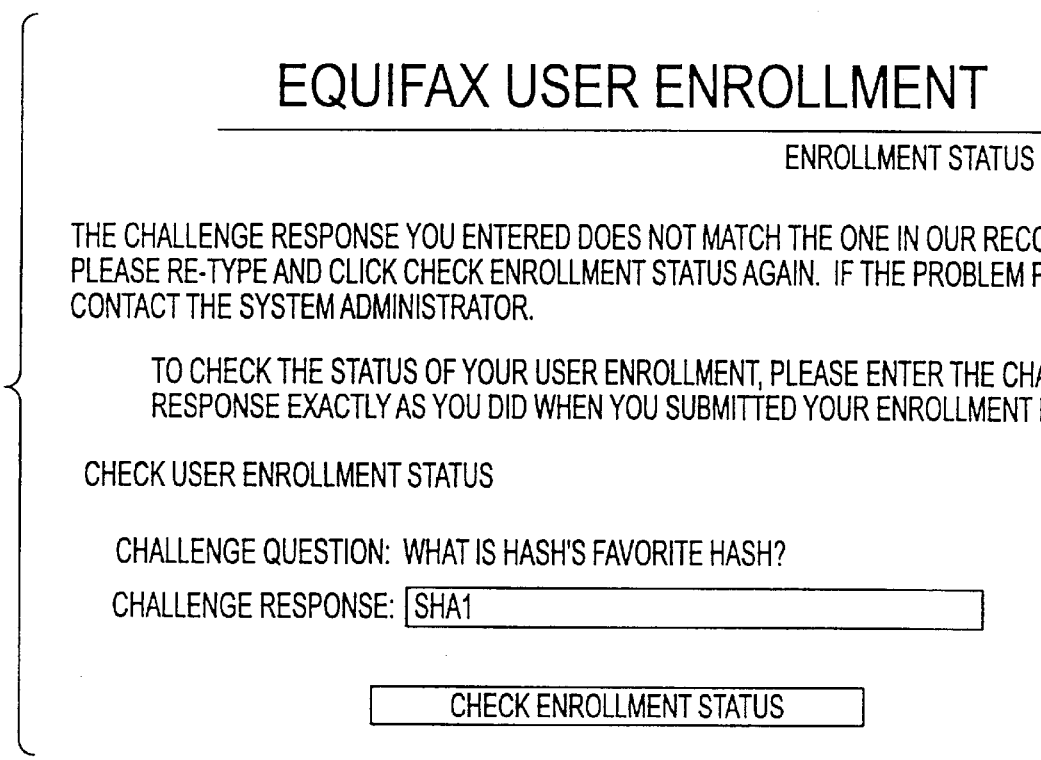
Figure 41:
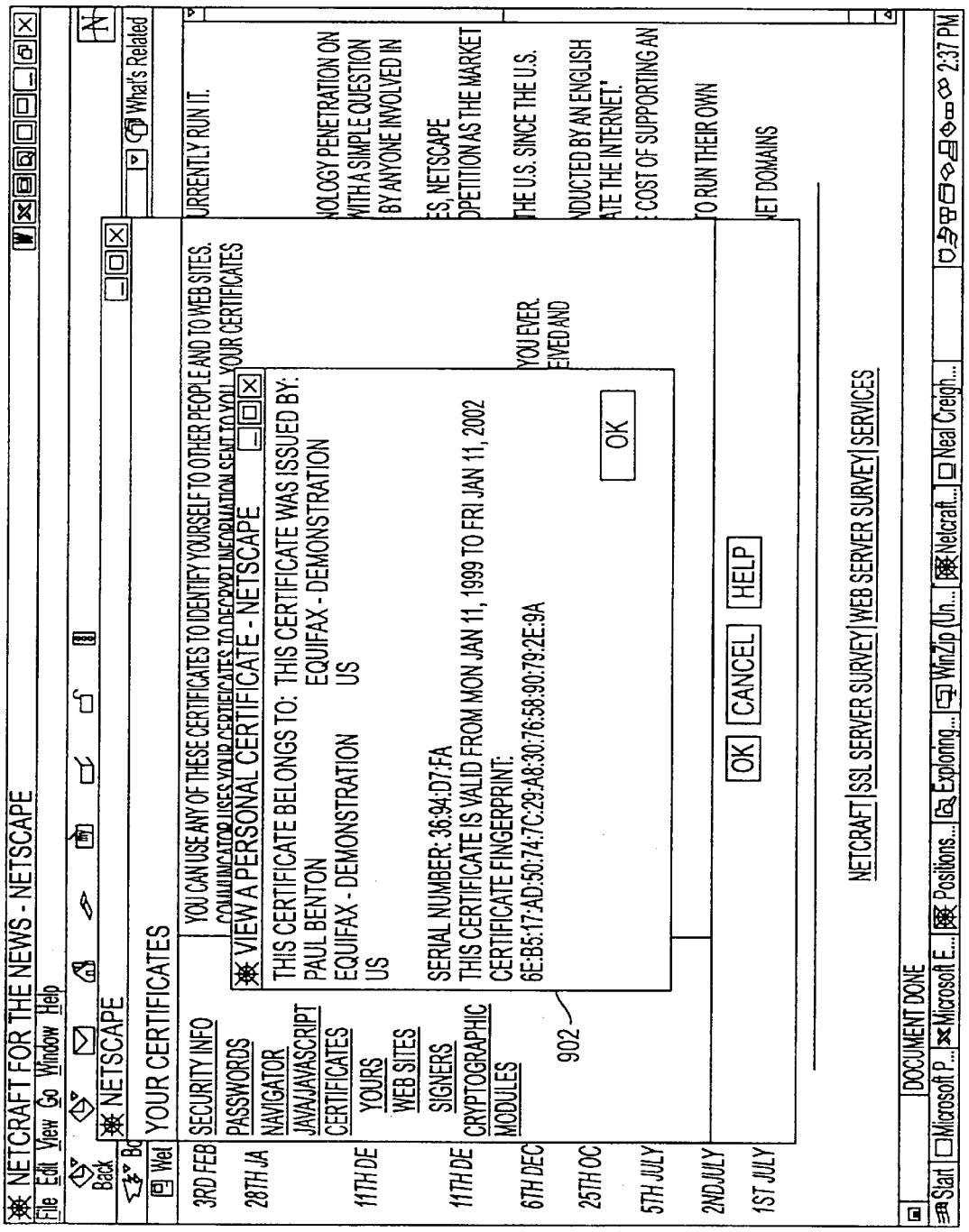
FIG. 41 illustrates a digital certificate generated according to the invention.

The digital certificate 902 may be preferably stored in secure fashion on client 110, that is, protected by user identification and challenge or password queries before the recipient can release the digital certificate 902 for further transactions, as illustrated in FIGS. 37 and 38. Digital certificate 902 may be a data file stored in common machine readable format that upon proper release by the user can be presented to other authentication servers for later transactions, as evidence of identity and avoiding the need to reauthenticate the user for later events. As illustrated, digital certificate 902 contains an expiration field, but the certificate can be generated to persist indefinitely.

Digital certificate 902 may be updated using a full or abbreviated authentication process 10 according to the invention, according to the grade of security required for particular future transactions. For example, a digital certificate 902 may be issued recording a medium grade of confidence of the user's identity, but to execute a sensitive transaction, the user may need to update and upgrade the digital certificate 902 to perform that later transaction.

Although illustrated with two levels of authentication processing, it will be understood that the invention contemplates three or more levels of authentication performing additional checks using additional databases or prompting the user for more information, when appropriate to transaction requirements. Any of the levels of the authentication process 10 may be implemented via an interactive query format, e.g., using a multiple choice check-off box. At no time during presentation of the interactive query is the user presented with potential answers revealing only correct information, so that identification information cannot be captured simply by entering authentication process 10. Moreover, in the implementation of the invention it is possible to follow the entire authentication process 10 with a consumer profiling step, in which the now-authenticated user identity is associated with purchase, travel, geographic and other information to enable more highly targeted marketing or transaction activity.

In general, in the execution of the authentication process 10 of the invention, answers to the interactive query questions are given highest relative weighting, followed by authentication checks against a user's credit file, followed by telephone information and then driver's license information.

Figure 4:
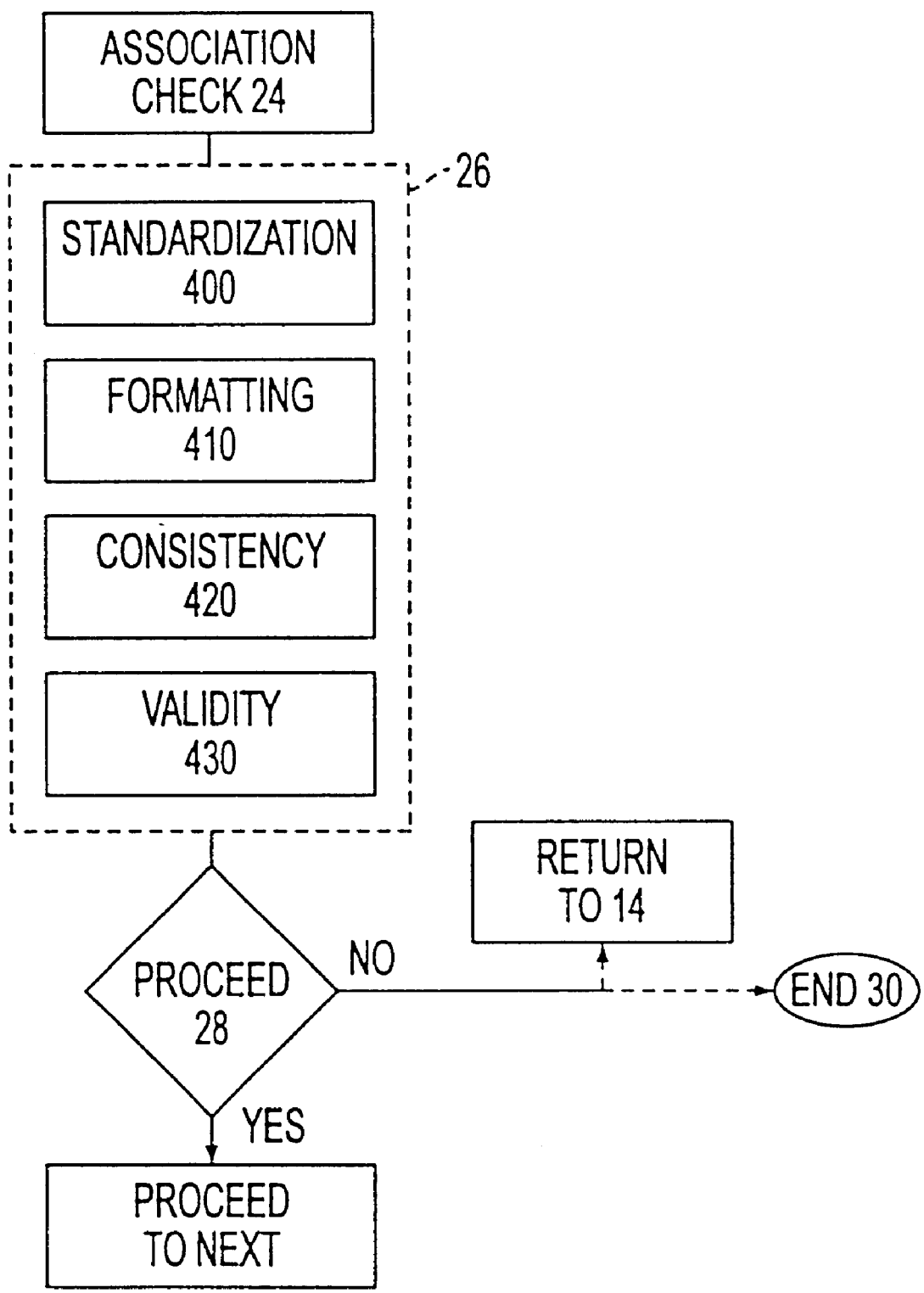
FIG. 4 is a flowchart of a preprocessing process according to the invention.
Figure 5:
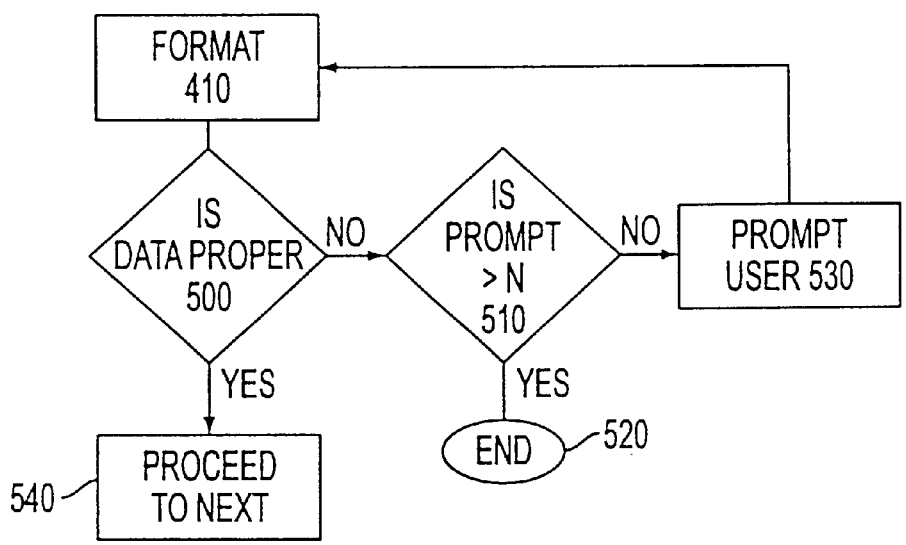
FIG. 5 is a flowchart depicting a format verification process according to the invention.

As shown in FIG. 4 and described above, the preprocessing step 26 may be conducted before the hierarchy of authentication levels and include several preliminary procedures, mainly designed to ensure consistency in format. Discussion will return to preprocessing step 26 to describe the preprocessing stage in more detail in conjunction with FIGS. 5–8. It will be understood that various combinations of standardization 400, formatting verification 410, verifying consistency 420, and verifying data validity 430 may be incorporated into the preprocessing step 26. As illustrated in FIG. 1, after preprocessing step 26 is executed a decision 28 is made whether authentication should proceed. The decision 28 may result in a return to initial step 14 or an end to the automated authentication process 10 at step 30.

If preprocessing step 26 includes a formatting verification 410, the following process may be followed. The user input data is checked at step 500 to determine that it is properly formatted. For example, the data may be checked to verify that the required fields have been entered (e.g., user name) or that the proper number of characters have been entered (e.g., nine digits for a social security number). If the result of the decision step 500 is that the data is not in the proper form, a determination is made at step 510 whether the user has been prompted for this information previously.

The authentication process 10 may be configured to allow a predetermined number of chances for the user to input data in the correct format. If the number of attempts exceeds the predetermined number, the process may terminate at step 520. If the predetermined number of chances has not been exceeded, the user may be prompted to input the data in the correct format at step 530. If the data is in the correct format, the process proceeds to step 540.

Figure 6:
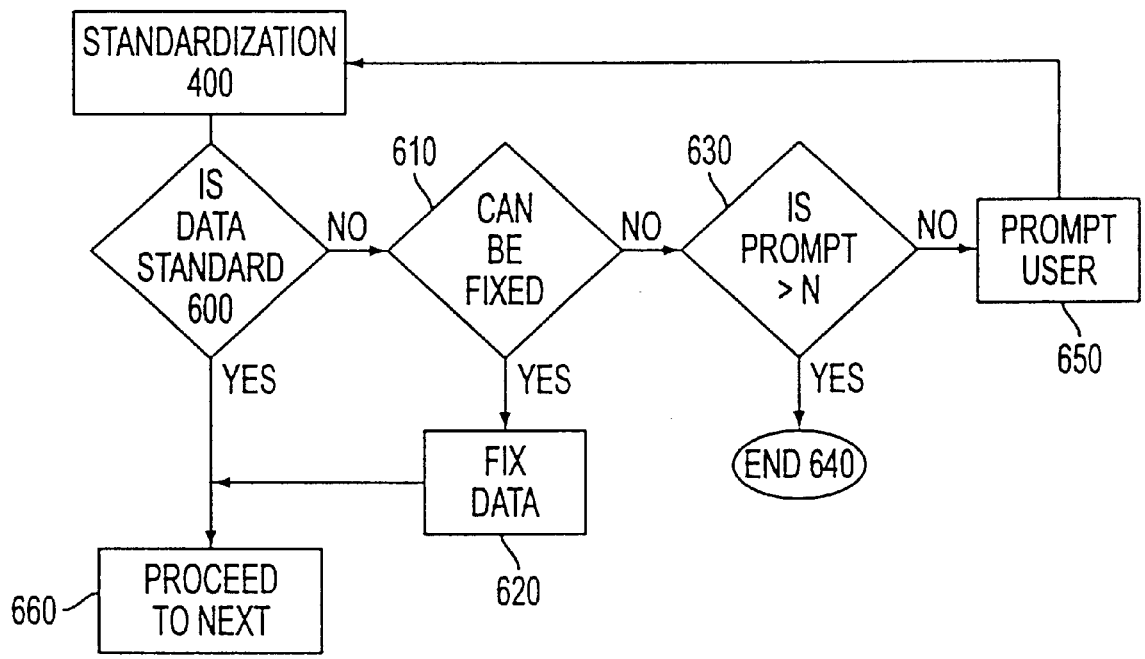
FIG. 6 is a flowchart depicting a standardization process according to the invention.

FIG. 6 depicts the process for standardization 400 of the data. At step 600 a determination is made whether the data is in the proper standard form. For example, the user's postal address may be checked for misspelled street names, or unnecessary punctuation. If the determination 600 finds the data to be non-standard, a determination 610 is made whether the non-standard data can be corrected. If the data can be corrected, it may be accomplished at step 620 by internal or other processes. If the data cannot be corrected, a determination is made at step 630 whether the user has been prompted for this information previously.

The authentication process may be configured to allow a predetermined number of chances for the user to input data in the correct format. If the number of attempts exceeds the predetermined number, the process may terminate at step 640. If the predetermined number of chances has not been exceeded, the user may be prompted to input standard data at step 650. If the data is in standard form, the process proceeds to the step 660.

Figure 7:
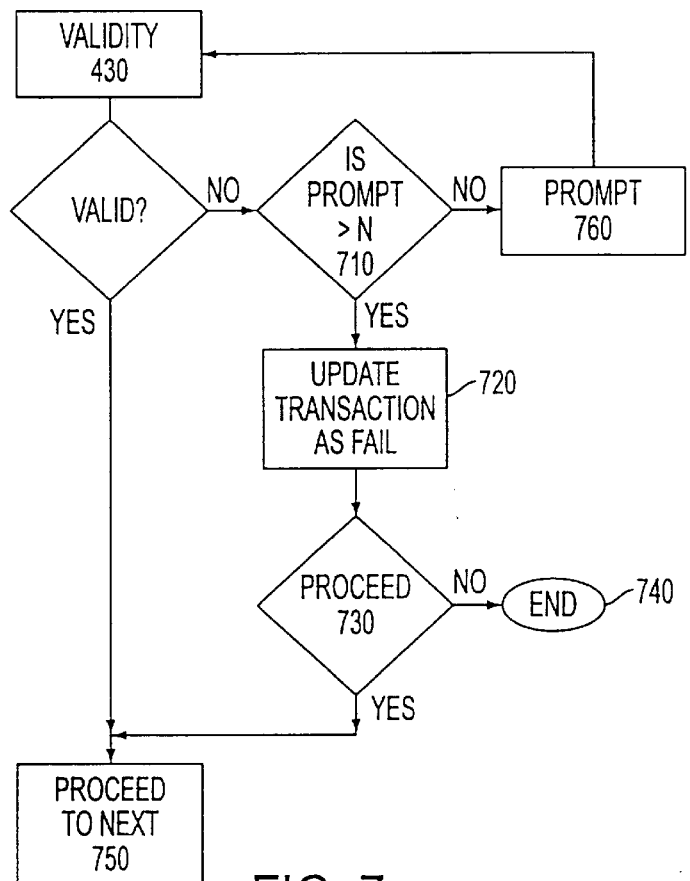
FIG. 7 is a flowchart depicting a validity verification process according to the invention.

FIG. 7 depicts the process for determining the validity 430 of the data. For example, the validity may be verified by determining at step 700 whether the data is valid (e.g., does the social security number match any social security number found on the published deceased or fraudulent table). If the determination is made that the data is invalid, a determination 710 is made at step 710 whether the user has been prompted for this information previously. If the number of attempts exceeds the predetermined number, the process may update the transaction record at step 720 to reflect the presence of the invalid data.

After the transaction record 112 is updated in step 720, an additional determination is made at step 730 of whether the process can proceed with this invalid data. If not, the process may terminate at step 740. If it can, the process may proceed to step 750. If the predetermined number of chances has not been exceeded, the user may be prompted to input valid data at step 760. If the data is valid, the process proceeds to step 750.

Figure 8:
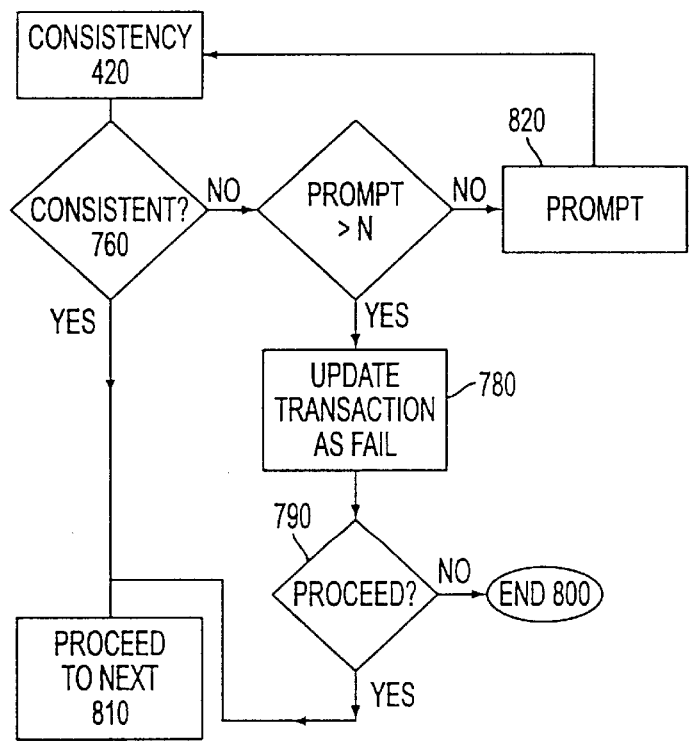
FIG. 8 is a flowchart depicting a consistency verification process according to the invention.

A similar process may be followed to determine whether the data is consistent at step 420, as illustrated in FIG. 8. In step 760, the determination is made whether the data from separate field entries are consistent. For example, data may be checked to verify that the area code entered matches the zip code entered. If the determination is made that the data entered by the user is not consistent, a determination is made at step 770 whether the user has been prompted for this information previously. If the number of attempts exceeds the predetermined number, the process may update the transaction record 112 in step 780 to reflect the presence of the inconsistent data.

After the transaction record 112 is updated 780, an additional determination is made at step 790 of whether the process can proceed with this inconsistent data. If not, the process may terminate at step 800. If it can, the process may proceed to step 810. If the predetermined number of chances has not been exceeded, the user may be prompted to input valid data at step 820. If the data is valid, the process proceeds to step 810 and the next preprocessing check.

FIGS. 9–11 show an example of the use of a matrix to verify address information in processing validity 430 or consistency 420. As shown, the verification process, which may be implemented using the commercially available PostalSoft, generates a matrix of address values to determine certain address information. FIG. 10 shows an example of certain error codes which may be generated to prompt user responses according to PostalSoft format when entered values, such as zip code, are not in proper format. FIG. 11 shows an example of certain actions and messages according to other types of data entered during processing for consistency 420.

Generally speaking, there are several ways to administer the queries at the various levels of authentication of the invention, depending upon the requirements of the transaction. If the user is available at the time of application for an interactive dialog (e.g., Internet request), a multiple choice questionnaire is preferably dynamically created by authentication process 10 and presented to the user, through client 110, for completion.

Multiple choice alternatives for each question are preferably selected based upon the regional biases of the user, if applicable, and are designed to make it difficult for a fraudulent applicant to correctly guess the answers. That is, potential selections for various credit line or merchant account providers are provided in the same general geographic region as the user's home address, so that credit line account vendors are not obviously wrong based on location. The user points and clicks on their selections, or provides answers in some other suitable way. The user-supplied answers are then returned to authentication process 10 by client 110 for automated evaluation.

If the user is not present at the time of application (e.g., batch submission), the information required to administer validation is provided on the initial application. If the user supplies account numbers, second level authentication step 40 will attempt to make the comparisons automatically. However, if the comparisons cannot be made automatically or the account numbers are not provided, the comparisons may be accomplished manually through human intervention. The results are returned to second level authentication step 40 for final evaluation.

FIG. 18 illustrates an example authentication carried out according to authentication process 10 of the invention. In general, as illustrated in that figure, the user presents name, social security number, date of birth, email and mailing address information, followed by home telephone number and driver's license data That information is accepted and processed through preprocessing step 26 and first level authentication step 32, after which it is determined that the data are consistent and merit proceeding to second level authentication step 40.

In second level authentication step 40, a sequence of questions are presented in an interactive query directed to mortgage account information, requesting lender and amount information followed by other merchant account information. Following successful authentication, the user is asked whether they wish to generate digital certificate 902, which is generated recording the successful authentication and protecting the digital certificate 902 by way of identification and challenge question data.

Any or all of the processing steps described above can be invoked selectively or rearranged to constitute a complete authentication process 10. The requirements of the transaction will determine which processes to combine for particular authentication needs. It is possible to configure several different implementations as standard offerings. The party employing the authentication system (vendor) can either use these standard offerings, or customize a configuration to their needs. With any implementation, the invention allows flexibility in determining certainty of authenticity, either through process configuration or setting certainty thresholds.

In the practice of the invention, in the event of temporary downtime or other unavailability of any of the data sources used for comparison, the invention may revert to a backup source for that particular type of information (which may be generally consistent but not as current), substitute another data source, or take other action.

Figure 42:
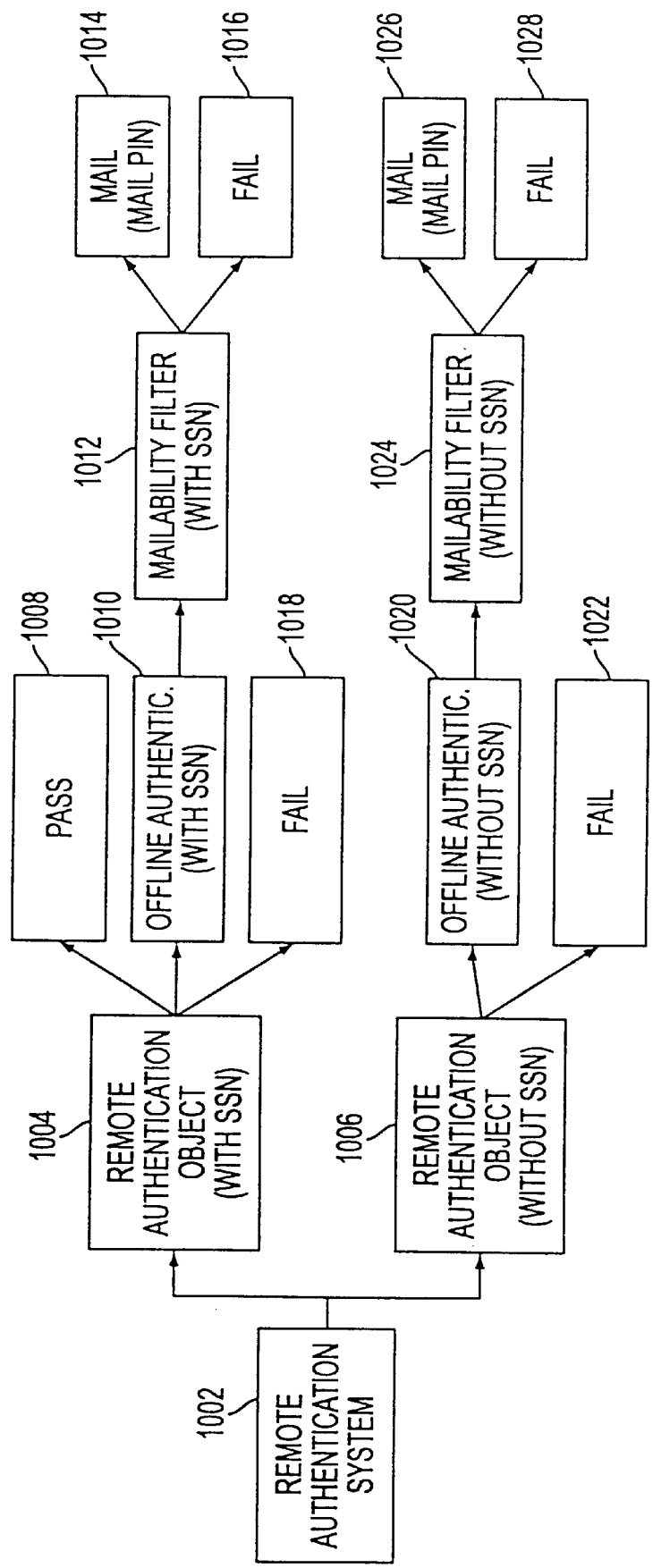
FIG. 42 illustrates a remote authentication system according to the invention in which authentication is performed in an offline fashion.

FIG. 42 illustrates an offline remote authentication embodiment of the invention, in which some processing including delivery of a validated ID is conducted using ordinary mail. As illustrated in FIG. 42, in this embodiment, a remote authentication system 1002 controls two processing objects, a remote authentication object with a social security number field 1004, and a remote authentication object without a social security number field 1006. The remote authentication system 1002 invokes the remote authentication object 1004 when a user has presented a social security number, in an online application for a credit or other transaction. The remote authentication object 1004 may invoke the preprocessing step 26, to process standard field checks as in the other embodiments above. In this embodiment, in part because of the requirements for mail delivery, failure of one or more data fields for address standardization, such as zip code errors, blank fields, foreign addresses, and undeliverables may result in a failure state 1018. The failure state 1018 may also be reached when age is less than a predetermined level, or standard social security checks as described above are not met. Other factors which may result in a failure state 1018 include mix matches concerning telephone numbers, social security numbers and fraud victim indicators present in a credit file.

If the remote authentication object 1004 determines that the user has achieved a sufficient score during preprocessing step 26 and any further processing steps, the pass state 1008 may be reached. Online issuance of a digital certificate 902 or other authentication may ensue. However, if the remote authentication object 1004 determines that the user's score lies between those designated for a pass state 1008 and a failure state 1018, the remote authentication object may offer an offline authentication state 1010, in which verification is transmitted using regular mail.

In this condition, offline authentication state 1010 invokes mailability filter 1012, which tests for matches on first initial, last name, a house number and zip code from at least one address database, as well as consistency of age and year of birth and a social security number which is either valid or shows no more than a small number of digit transpositions. Other criteria may be applied. If a sufficient score is reached in the mailability filter 1012 processing, a mail state 1014 is reached in which the entered addressing information is used to transmit a PIN or other identification information to the user via regular mail. If a sufficient score is not reached in the mailability filter 1012, a failure state 1016 is reached, no verification is sent by mail and processing terminates.

If a user fails to supply a social security number, as illustrated in FIG. 42 control is passed to remote authentication object 1006, which may apply the preprocessing step 26 and further steps to test inputted user information. If the inputted user information does not reach a predetermined threshold, control passes to a failure state 1022. If a sufficient authentication score is reached, processing proceeds to offline authentication object 1020. Offline authentication object 1020 invokes mailability filter 1024 which processes the user-supplied input without a social security number to determine whether address standardization, age- related, address-related, or fraud flags are present. If a sufficient authentication score is reached in mailability filter 1024, control passes to the mail state 1026, in which a valid identification PIN is transmitted to the user at the entered address using regular mail. Conversely, if mailability filter 1024 is not satisfied, a failure state 1028 is reached in which no material is mailed and processing terminates.

Figure 43:
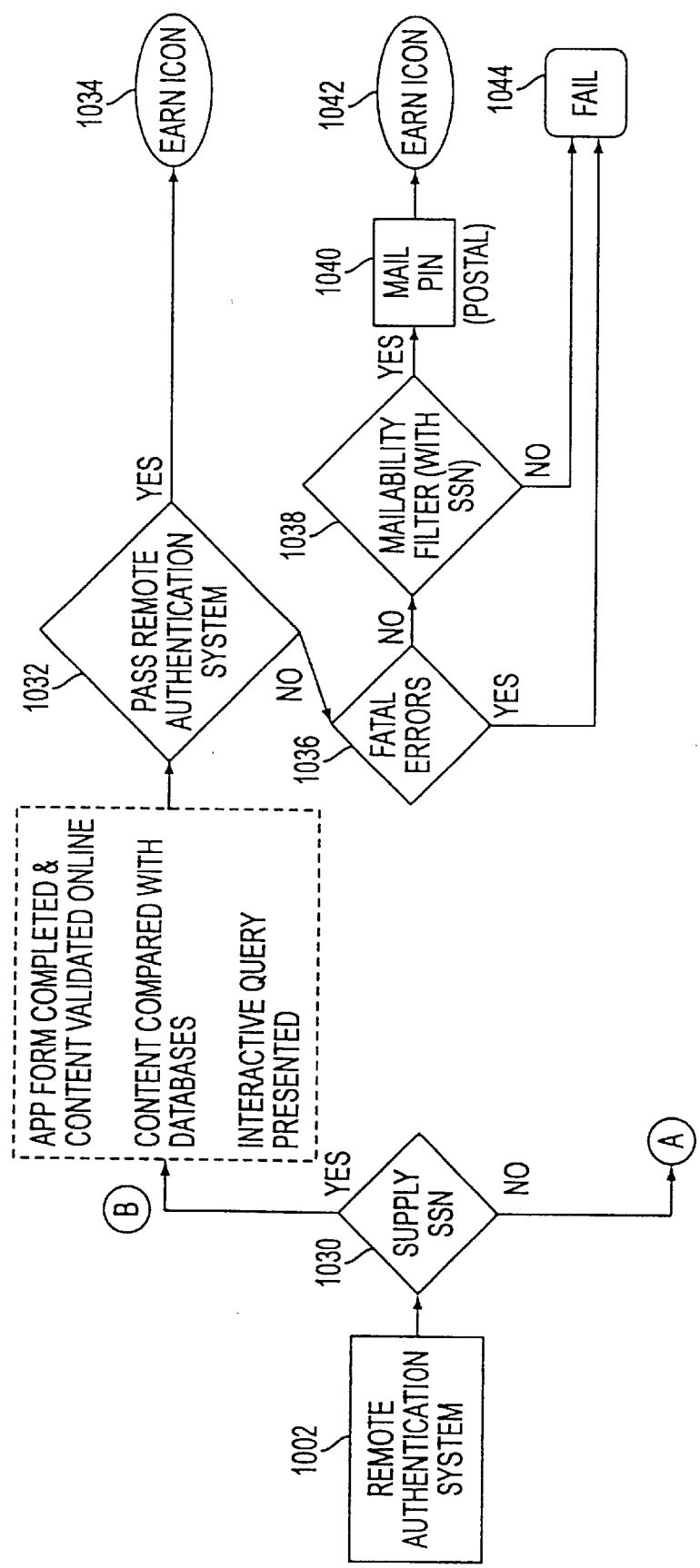
FIG. 43 illustrates the offline remote authentication embodiment of the invention operating when a social security number data field is supplied.

An embodiment of the remote authentication system 1002 is illustrated in more detail in FIG. 43, in which a social security supply object 1030 tests whether the user is capable of providing a social security number field. If the user is capable of providing a social security number field, control proceeds to pass test module 1032, which may perform preprocessing step 26, first level authentication step 32, second level authentication step 40 or other processing. If the user passes those levels of authentication with a sufficient score, control passes to an earned icon state 1034, providing the user with an online authentication icon, digital certificate 902 or other issued verification.

If the pass test module 1032 is not passed, a fatal error object 1036 may test for fatal errors in social security, address, age-related or other desired data fields. If fatal error object 1036 does not detect a fatal error, control passes to a mailability filter 1038 which tests for mailability using zip code and state, name, deliverability and other field checks, after which a mail state 1040 is entered if the user has successfully established reliable information. After mail state 1040 is entered, both the PIN may be mailed via regular mail and a user icon issued in earned icon state 1042. Conversely, if either the fatal error object 1036 or mailability filter 1038 are not satisfied with the information the user has entered, a failure state 1044 is entered, and processing ends without transmitting an ID via mail or an icon being issued.

Figure 44:
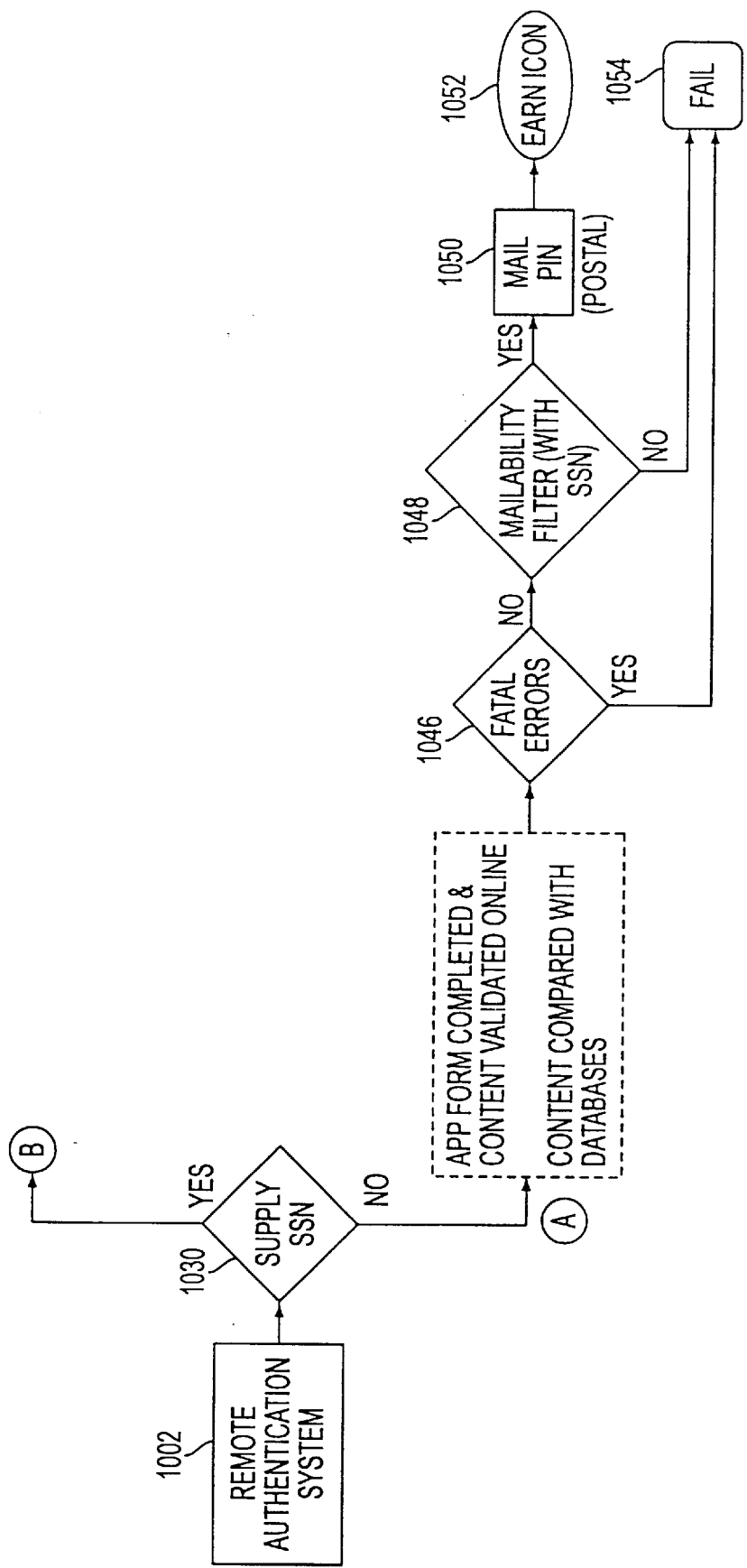
FIG. 44 illustrates the offline remote authentication embodiment of the invention operating when a social security field is not supplied.

As illustrated in FIG. 44, alternatively if the user is not capable of supplying a social security number to social security test object 1030, then control passes to fatal error object 1046. If no fatal error is detected by fatal error object 1046, control is passed to mailability filter 1048, which tests for deliverable mailing information, as above. If mailability filter 1048 is satisfied, the mail state 1050 is reached in which a regular PIN identification is mailed via mail to the user, after which an earned icon state 1052 is reached, issuing the user an online icon identification. Conversely, if either the fatal error object 1046 or mailability filter 1048 are not satisfied, a failure state 1054 is reached, and processing ends.

The foregoing description of the authentication system and method of the invention is illustrative, and variations in construction and implementation will occur to persons skilled in the art. For instance, while the invention has been generally described as involving a single user supplying authentication information in a single interactive session or alternatively in batch mode, both queries and user input may be provided at different times using different input modes, when the transaction allows. This may be the case for instance when the transaction involves setting up an online subscription to publications or services.

For further example, while the invention has been described in a client/server environment in which a user initiates a transaction using a personal computer or other device over a computer network, the user could initiate the transaction over other networks. The user for instance could conduct a transaction using a cellular telephone equipped with an alphanumeric display which permits the user to keypad data in over the mobile cellular network.

For yet further example, while the invention has been illustrated in terms of an individual consumer initiating a network transaction, the invention can also verify the identity of other entities such as corporations, schools, government units and others seeking to transact business over a network. Those entities can be international in nature. The scope of the invention is accordingly intended to be limited only by the following claims.

What is claimed is:

1. A method of authenticating a user on a network, said method comprising:
   a) performing a first authentication step based on a first type of information; and
   b) performing at least a second authentication step based on a second type of information other than the first type of information, wherein at least one of step (a) and step (b) comprises generating an interactive query, the interactive query comprising at least one question having multiple-choice answers, wherein only one of the answers is the correct answer.

2. The method of claim 1, wherein the network comprises the Internet.

3. The method of claim 1, wherein the first information comprises at least one of name information, address information, social security number information, gender information, birth date information, telephone number information, email information, and driver's license information.

4. The method of claim 1, wherein the second information comprises at least one of credit card information, mortgage information, other loan information, and monthly payment information.

5. A method of authenticating a user on a network, said method comprising:
   a) performing a first authentication step based on a first type of information; and
   b) performing at least a second authentication step based on a second type of information other than the first type of information, the second type of information comprising information pertaining to credit accounts to which the user is a party, the information pertaining to credit accounts comprising mortgage loan information, wherein the user is requested to identify at least one of:
      i) mortgage lender information; and
      ii) mortgage loan amount information.

6. The method of claim 5, wherein the network comprises the Internet.

7. The method of claim 5, wherein the first information comprises at least one of name information, address information, social security number information, gender information, birth date information, telephone number information, email information, and driver's license information.

8. The method of claim 5, wherein the second information comprises at least one of credit card information, mortgage information, other loan information, and monthly payment information.

9. A method of authenticating a user on a network, said method comprising:
   a) performing a first authentication step based on a first type of information, performing a first authentication step further comprising:
      i) obtaining the first type of information from the user;
      ii) retrieving user identification information from a data source;
      iii) comparing the first type of information supplied by the user with the user identification information retrieved from the data source; and
      iv) determining a level of correspondence between the first type of information supplied by the user and the user identification information retrieved from the data source; and
   b) performing at least a second authentication step based on a second type of information other than the first type of information, wherein the data source for the first type of information is used to identify the availability of the second type of information for the user.

10. The method of claim 9, wherein the network comprises the Internet.

11. The method of claim 9, wherein the first information comprises at least one of name information, address information, social security number information, gender information, birth date information, telephone number information, email information, and driver's license information.

12. The method of claim 9, wherein the second information comprises at least one of credit card information, mortgage information, other loan information, and monthly payment information.

13. A method of authenticating a user on a network, said method comprising:
   a) performing a first authentication step based on a first type of information;
   b) performing at least a second authentication step based on a second type of information other than the first type of information; and
   c) storing a transaction record of the first authentication step.

14. The method of claim 13, wherein the network comprises the Internet.

15. The method of claim 13, wherein the first information comprises at least one of name information, address information, social security number information, gender information, birth date information, telephone number information, email information, and driver's license information.

16. The method of claim 13, wherein the second information comprises at least one of credit card information, mortgage information, other loan information, and monthly payment information.

17. A method of authenticating a user on a network, said method comprising;
   a) performing a first authentication step based on a first type of information;
   b) performing at least a second authentication step based on a second type of information other than the first type of information; and c) executing a pattern recognition process to detect potential irregularities in at least one of the first type of information and the second type of information.

18. The method of claim 17, wherein the network comprises the Internet.

19. The method of claim 17, wherein the first information comprises at least one of name information, address information, social security number information, gender information, birth date information, telephone number information, email information, and driver's license information.

20. The method of claim 17, wherein the second information comprises at least one of credit card information, mortgage information, other loan information, and monthly payment information.

21. A method of authenticating a user on a network, said method comprising:
  a) performing a first authentication step based on a first type of information;
  b) performing at least a second authentication step based on a second type of information other than the first type of information; and
  c) performing a remote authentication step based upon at least one of the first type of information and the second type of information.

22. The method of claim 21 wherein the step (c) of performing a remote authentication step further comprises filtering through a mailability filter the at least one of the first type of information and the second type of information.

23. The method of claim 21, wherein the network comprises the Internet.

24. The method of claim 21, wherein the first information comprises at least one of name information, address information, social security number information, gender information, birth date information, telephone number information, email information, and driver's license information.

25. The method of claim 21, wherein the second information comprises at least one of credit card information, mortgage information, other loan information, and monthly payment information.

26. A system for authenticating a user on a network, said system comprising:
  an input interface for receiving input from the user; and
  a processor connected to the input interface and configured to:
    perform a first authentication based on a first type of information; and
    perform at least a second authentication based on a second type of information other than the first type of information, wherein the processor generates an interactive query, the interactive query comprising at least one question having multiple-choice answers wherein only one of the answers is the correct answer.

27. The system of claim 26, wherein the network comprises the Internet.

28. The system of claim 26, wherein the first information comprises at least one of name information, address information, social security number information, gender information, birth date information, telephone number information, email information, and driver's license information.

29. The system of claim 26, wherein the second information comprises at least one of credit card information, mortgage information, other loan information, and monthly payment information.

30. A system for authenticating a user on a network, said system comprising:
  an input interface for receiving input from the user; and
  a processor connected to the input interface and configured to:
    perform a first authentication based on a first type of information, the first type of information comprising wallet-type information; and
    performing at least a second authentication based on a second type of information other than the first type of information wherein the second type of information comprises non-wallet type information and pertains to credit accounts to which the user is a party, the second type of information pertaining to credit accounts further comprising mortgage loan information, and performing at least a second authentication further comprises a request for the user to identify at least one of:
    mortgage lender information; and
    mortgage loan amount information.

31. The system of claim 30, wherein the network comprises the Internet.

32. The system of claim 30, wherein the first information comprises at least one of name information, address information, social security number information, gender information, birth date information, telephone number information, email information, and driver's license information.

33. The system of claim 30, wherein the second information comprises at least one of credit card information, mortgage information, other loan information, and monthly payment information.

34. A system for authenticating a user on a network, said system comprising:
  an input interface for receiving input from the user; and
  a processor connected to the input interface and configured to:
    perform a first authentication step based on a first type of information, the first authentication comprising
      obtaining the first type of information from the user;
      retrieving user identification information from a data source;
      comparing the first type of information supplied by the user with the user identification information retrieved from the data source; and
      determining a level of correspondence between the first type of information supplied by the user and the user identification information retrieved from the data source; and
    perform at least a second authentication step based on a second type of information other than the first type of information, wherein the user identification information retrieved from the data source is used to identify the availability of the second type of information for the user.

35. The system of claim 34, wherein the network comprises the Internet.

36. The system of claim 34, wherein the first information comprises at least one of name information, address information, social security number information, gender information, birth date information, telephone number information, email information, and driver's license information.

37. The system of claim 34, wherein the second information comprises at least one of credit card information, mortgage information, other loan information, and monthly payment information.

38. A system for authenticating a user on a network, said system comprising:
- an input interface for receiving input from the user; and
- a processor, connected to the input interface and configured to:
  - perform a first authentication step based on a first type of information; and
  - perform at least a second authentication step based on a second type of information other than the first type of information, wherein the processor stores a transaction record of the first authentication step.

39. The system of claim 30, wherein the network comprises the Internet.

40. The system of claim 38, wherein the first information comprises at least one of name information, address information, social security number information, gender information, birth date information, telephone number information, email information, and driver's license information.

41. The system of claim 38, wherein the second information comprises at least one of credit card information, mortgage information, other loan information, and monthly payment information.

42. A system for authenticating a user on a network, said system comprising:
- an input interface for receiving input from the user; and
- a processor, connected to the input interface and configured to:
  - perform a first authentication step based on a first type of information; and
  - perform at least a second authentication step based on a second type of information other than the first type of information, wherein the processor executes a pattern recognition process to detect potential irregularities in the input supplied by the user.

43. The system of claim 42, wherein the network comprises the Internet.

44. The system of claim 42, wherein the first information comprises at least one of name information, address information, social security number information, gender information, birth date information, telephone number information, email information, and driver's license information.

45. The system of claim 42, wherein the second information comprises at least one of credit card information, mortgage information, other loan information, and monthly payment information.

46. A system for authenticating a user on a network, said system comprising:
- an input interface for receiving input from the user; and
- a processor, connected to the input interface and configured to:
  - perform a first authentication step based on a first type of information; and
  - perform at least a second authentication step based on a second type of information other than the first type of information,
- wherein the processor further performs a remote authentication step based upon at least one of the first type of information and the second type of information.

47. The system of claim 46, wherein the offline authentication comprises applying a mailability filter to the at least one of the first type of information and the second type of information.

48. The system of claim 46, wherein the network comprises the Internet.

49. The system of claim 46, wherein the first information comprises at least one of name information, address information, social security number information, gender information, birth date information, telephone number information, email information, and driver's license information.

50. The system of claim 46, wherein the second information comprises at least one of credit card information, mortgage information, other loan information, and monthly payment information.

* * * * *

UNITED STATES PATENT AND TRADEMARK OFFICE
CERTIFICATE OF CORRECTION

PATENT NO. : 6,363,447 B1  
DATED : March 26, 2002  
INVENTOR(S) : Larson

Page 1 of 1

It is certified that error appears in the above-identified patent and that said Letters Patent is hereby corrected as shown below:

<u>Column 8,</u>  
Line 32, please delete the word "rant" and replace with the word -- grant --.

Signed and Sealed this

Twenty-eighth Day of May, 2002

Attest:

Attesting Officer

JAMES E. ROGAN  
Director of the United States Patent and Trademark Office